(12) United States Patent
Peddi

(10) Patent No.: US 9,224,231 B2
(45) Date of Patent: Dec. 29, 2015

(54) AUGMENTED REALITY SYSTEM INDEXED IN THREE DIMENSIONS

(71) Applicant: Nagabhushanam Peddi, Ann Arbor, MI (US)

(72) Inventor: Nagabhushanam Peddi, Ann Arbor, MI (US)

(*) Notice: Subject to any disclaimer, the term of this patent is extended or adjusted under 35 U.S.C. 154(b) by 141 days.

(21) Appl. No.: 14/026,909

(22) Filed: Sep. 13, 2013

(65) Prior Publication Data

US 2014/0080605 A1 Mar. 20, 2014

Related U.S. Application Data

(60) Provisional application No. 61/752,010, filed on Jan. 14, 2013, provisional application No. 61/701,039, filed on Sep. 14, 2012.

(51) Int. Cl.
*A63F 13/00* (2014.01)
*G06T 15/00* (2011.01)
*H04N 13/02* (2006.01)
*G09B 19/00* (2006.01)

(52) U.S. Cl.
CPC .............. *G06T 15/00* (2013.01); *A63F 13/00* (2013.01); *G09B 19/0038* (2013.01); *H04N 13/0203* (2013.01)

(58) Field of Classification Search
CPC ........... A63F 2300/10; A63F 2300/105; A63F 2300/1087; A63F 2300/204
USPC ......................................... 463/30, 31, 32, 36
See application file for complete search history.

(56) References Cited

U.S. PATENT DOCUMENTS

| 7,405,726 | B2 | 7/2008 | Pelosi |
| 7,647,289 | B2 | 1/2010 | Graepel et al. |
| 8,040,328 | B2 | 10/2011 | Smith et al. |
| 2004/0127304 | A1 | 7/2004 | Plank, Jr. |
| 2004/0130579 | A1* | 7/2004 | Ishii et al. ...................... 345/848 |
| 2005/0086669 | A1 | 4/2005 | Boyd et al. |
| 2009/0215536 | A1* | 8/2009 | Yee et al. ......................... 463/42 |
| 2009/0244097 | A1* | 10/2009 | Estevez .......................... 345/633 |
| 2009/0278917 | A1 | 11/2009 | Dobbins et al. |
| 2012/0088544 | A1 | 4/2012 | Bentley et al. |

FOREIGN PATENT DOCUMENTS

GB 000002491819 A 12/2012

* cited by examiner

*Primary Examiner* — James S McClellan
(74) *Attorney, Agent, or Firm* — Vincent Re PLLC

(57) ABSTRACT

A portable computerized device is configured to display a three dimensional graphic. The portable computerized device includes a camera device capturing an image including location data for each of a plurality of tokens. The portable computerized device is configured to display the three dimensional graphic based upon the location data.

13 Claims, 20 Drawing Sheets

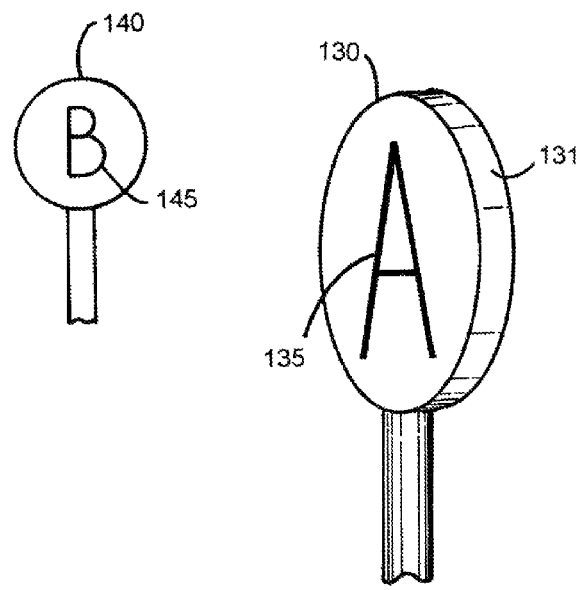
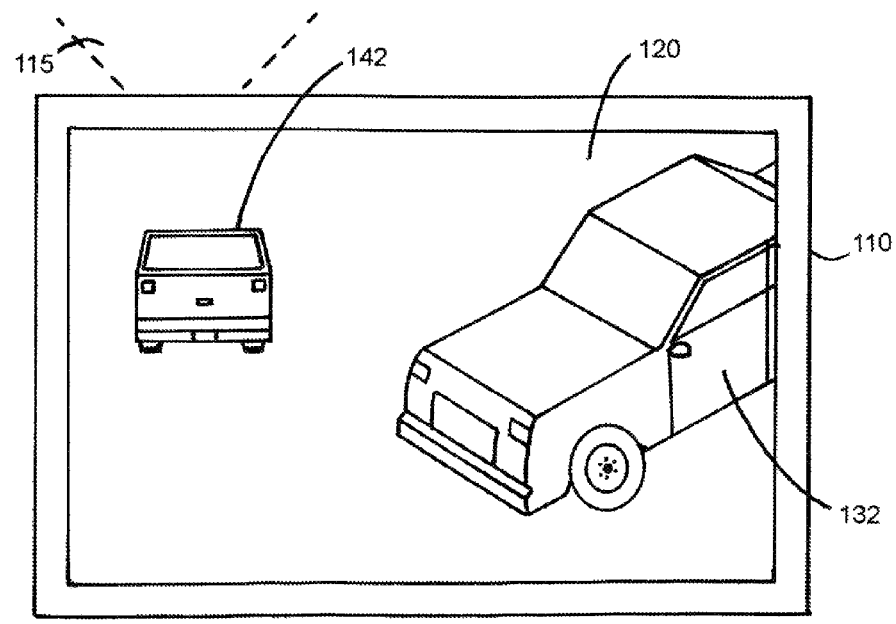
FIG.3

AUGMENTED REALITY SYSTEM INDEXED IN THREE DIMENSIONS

CROSS REFERENCE TO RELATED APPLICATIONS

This disclosure claims the benefit of U.S. Provisional Application No. 61/701,039 filed on Sep. 14, 2012 and U.S. Provisional Application No. 61/752,010 filed on Jan. 14, 2013 which are hereby incorporated by reference.

FIELD OF THE DISCLOSURE

The present disclosure relates generally to an augmented or virtual reality system indexed in three dimensions. In particular, examples of the present disclosure are related to use of an augmented reality system indexed in three dimensions based upon a plurality of tokens providing spatial input to the system.

BACKGROUND

The statements in this section merely provide background information related to the present disclosure. Accordingly, such statements are not intended to constitute an admission of prior art.

Augmented reality includes methods wherein computerized images are displayed to augment a view or experience in the real world. In one example, a computer generated image is presented upon or superimposed over a series of images captured by a camera associated with the view screen. Virtual reality, on the other hand, includes images in an entirely separate environment, with all elements upon the display being computer generated. Examples of augmented reality displays includes HUD displays, lines projected on a television image of a football field showing a first down mark on the field, and a glow projected on a television image of a hockey puck.

Smart-phones, tablet computers, and other similar portable computerized devices utilize camera devices to interact with their environment. In one exemplary embodiment, a smart-phone can capture an image of a quick response code (QR code) and an instruction can be provided to the phone based upon the image. In one example, the phone can be instructed to access a particular webpage over a communications network based upon the information provided by the QR code. Similarly a two-dimensional barcode can be used by a portable computerized device to provide an input to the device. A handheld unit in a store can permit a user to enter items onto a gift registry operated by the store based upon a scanned input.

SUMMARY

A portable computerized device is configured to display a three dimensional graphic. The device includes a camera device capturing an image including location data for each of a plurality of tokens. The portable computerized device can be configured to display the three dimensional graphic based upon the location data.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 3. illustrates an exemplary portable computerized device displaying an output generated based upon analysis of two tokens visible within a camera field of view, in accordance with the present disclosure;

Figure 1:
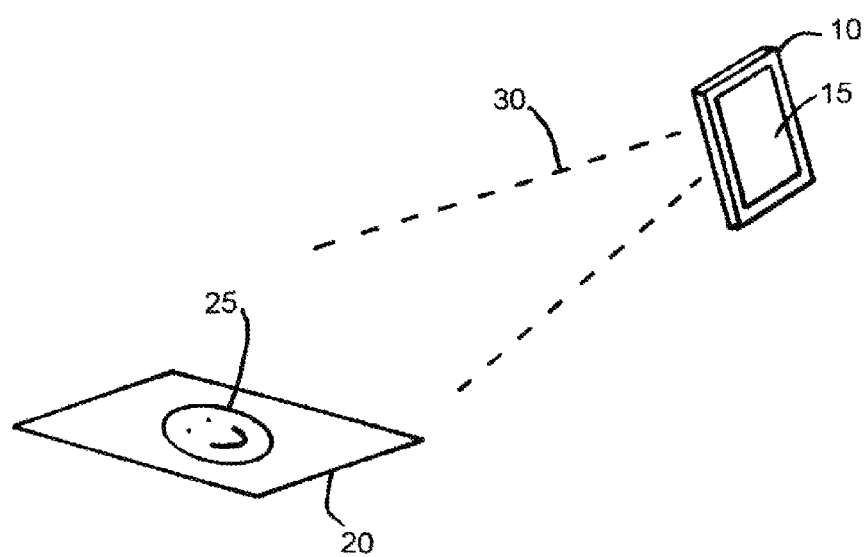
FIG. 1 is an illustration of a portable computerized device including a camera feature reading information from a token placed upon the ground, in accordance with the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Computerized devices and servers available over the Internet operate three dimensional computer models. Such models are known in the art and will not be described in detail herein. Such models can be manipulated to generate a changing display, e.g. changing a perspective upon the three dimensionally modeled object, by an input that is used to determine a point of view for the generated display. For example, a program can be created showing a three dimensional model of a car, and a user can manipulate a point of view by providing an input to a slider graphic. By moving a button with an exemplary mouse device, the graphic representation of the motor vehicle can be rotated in a horizontal plane through 360 degrees based upon the user's input to the mouse device. Similarly, the vehicle can be rotated to view a top of a bottom of the car through a second slider or, for example, by monitoring motion of the mouse device in both X and Y axes of input.

Augmented reality and virtual reality programs can monitor a captured image and use information from the captured image to input information. Image recognition software and related programming is known in the art and will not be described in detail herein. According to one embodiment, a spatial relationship of a known object can be determined based upon how the object appears in a captured image. Such a known object can be defined as a token for use by an augmented or virtual reality program. For example, if a one dollar bill, a well known pattern that can be programmed for identification within a computerized program, is laid upon a table and a program is utilized to analyze the dimensions of the image of the dollar bill, a determination can be made of a distance and an orientation of the dollar bill to the device capturing the image. This distance and/or orientation of the known object or token in a captured image can be used by an augmented or virtual reality program as an input for manipulating a three dimensional model.

Augmented or virtual reality can be used to model a wide variety of conditions and situations, generating virtual outputs upon a display based upon provided inputs and a three dimensional model. Such a software application can be used to model results that would be complicated or expensive to attempt in the real world. Such a software application displaying three dimensional model graphics can be used for education or entertainment. A co-pending application, U.S. application Ser. No. 14/026,870, is entitled AUGMENTED REALITY SYSTEM INDEXED IN THREE DIMENSIONS and is hereby incorporated by reference.

Known processes to model a physical location can include intensive programming, wherein a programmer must enter into the program intensive contours and surface details. A process is disclosed wherein a token or a plurality of tokens can be used to bypass such an intensive programming process, for example, permitting walls, ground elevations, important features, etc. to be set in a space or a landscape through placement of the tokens. A set of programmed rules or constraints, for example, including principles from physics, engineering standards, building codes, etc. can be utilized in combination with spatial inputs provided by tokens to quickly generate a dynamic output.

A token can be a two dimensional image printed upon a flat object. A token can be a three dimensional object or images printed upon a three dimensional object. A token can be a simple design, for example, printable upon a single sheet of paper. A token can be imprinted upon a decorative object. An object printed with a token can be a sellable object, for example, wherein information on the object can enable a user to download and/or initiate a corresponding instruction program. In one exemplary embodiment, a token recognized by a user's device can act similarly to a QR code, automatically instructing the device to go to a particular webpage whereat an executable program can be executed or downloaded. End user license information for a program can be contained upon a printed object also acting as a token.

Referring now to the drawings, wherein the showings are for the purpose of illustrating certain exemplary embodiments only and not for the purpose of limiting the same, FIG.

1 illustrates a portable computerized device including a camera feature reading information from a token placed upon a surface. Portable computerized device 10 includes viewscreen 15. An exemplary portable computerized device 10 further includes a processor, RAM memory, and storage memory in the form of a hard drive, flash memory, or other similar storage devices known in the art. Portable computerized device 10 can further be connected to a wireless communication network through cellular connection, wireless LAN connection, or other communication methods known in the art. Portable computerized device further includes software, such as an operating system and applications configured to monitor inputs, for example, in the form of touch inputs to a touch screen device, inputs to the camera device, and audio inputs and control outputs, for example, in the form of graphics, sounds, and communication signals over the wireless connection. View-screen 15 can include a touch screen input. Other exemplary devices use button inputs, trackball and button inputs, eye focus location sensors, or other methods known in the art. The camera device of portable computerized device 10 can include a lens and optical sensor according to digital cameras or smart-phones known in the art capable of capturing a visual image and translating it into a stored digital representation of the image. View 30 of the camera is illustrated. Any number of portable computerized devices can be utilized according to the methods disclosed herein, and the disclosure is not intended to be limited to the particular examples provided.

Token 20 is some graphic design, symbol, word, or pattern 25 that can be identified by a portable computerized device 10 through its camera device input. An application upon the portable computerized device 10 interprets images captured by the camera device and identifies the token within the image. Based upon the size and orientation of the token and the graphics or symbols thereupon in the image, a spatial relationship of the token to the image can be determined.

Graphical images displayed upon view-screen 15 can be based upon a three-dimensional model. Such models are well known in the art and can include simple geometric shapes or more complex models, for example, modeling the human form.

The application can include programming to create a graphical image upon view-screen 15 based upon manipulation of a model associated with token 20. Token 20 provides a reference point at which to anchor the graphical image and the orientation of the model upon which the image is based. According to one embodiment, the graphic based upon the model can be displayed upon the view-screen 15. In another embodiment, the image or a stream of images from the camera device can be displayed upon the view-screen 15, and the graphic based upon the model can, with the orientation based upon the sensed token, be superimposed over the images from the camera. In one embodiment, the graphic based upon the model can be located to partially or fully cover the token in the image.

Figure 2:
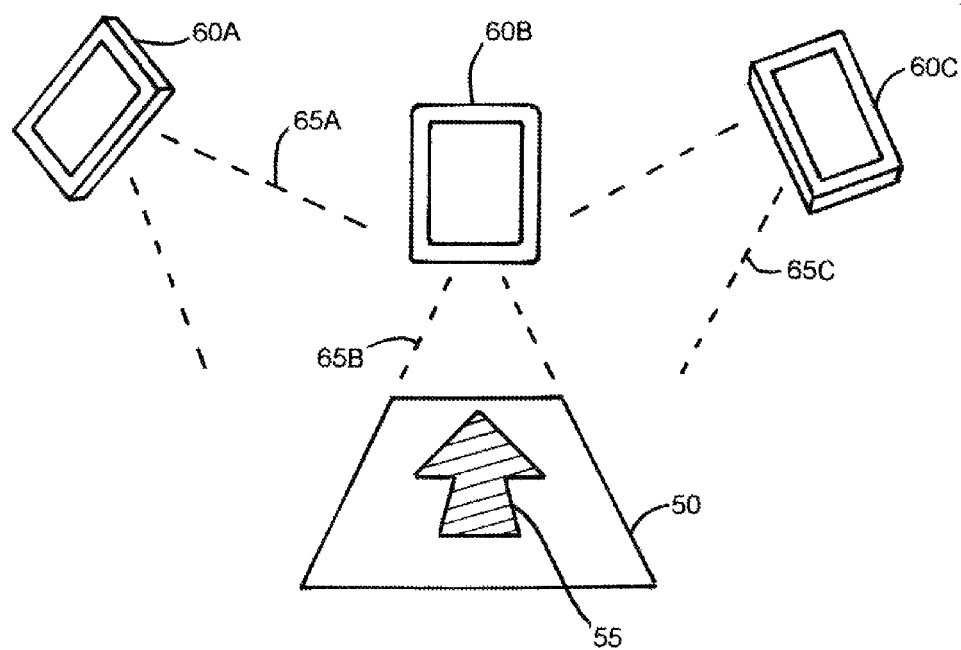
FIG. 2 is an illustration of a plurality of positions from which portable computerized devices can be located and view a token, in accordance with the present disclosure.

FIG. 2 illustrates a plurality of positions from which portable computerized devices can be located and view a token. Three portable computerized devices 60A, 60B, and 60C, are illustrated located at different locations with respect to token 50, and the camera devices of the portable computerized devices include respective views 65A, 65B, and 65C. Based upon identifying the token 50 and the graphic 55 thereupon, applications running upon each of portable computerized devices 60A, 60B, and 60C can interpret a location of the token with respect to the portable computerized device and manipulate a point of view of a programmed model associated with the token to represent a virtual object or character oriented based upon how the portable computerized device is located with respect to the token. Graphic 55 is illustrated as an arrow showing a graphic that can clearly indicate a direction in which the token is oriented. Further, based upon perspective of the graphic to the viewer or the portable computerized device viewing the graphic, an inclination of the token with respect to the portable computerized device can be determined. Further, based upon a size of the graphic within the image, a distance of the token from the portable computerized device viewing the graphic can be determined. The graphic is illustrated as an arrow for clarity of example, but any graphic with distinguishable orientation can be utilized upon token 50. Vivid colors and bright contrast in the graphic can be used to aid identification of the token and the graphic thereupon by the portable computerized device.

FIG. 3 illustrates an exemplary portable computerized device displaying an output generated based upon analysis of two tokens visible within a camera field of view. Portable computerized device 110 includes display 120 and a camera device capturing images in field of view 115. Tokens 130 and 140 are illustrated within view 115 of device 110. The tokens are given as being identical in configuration with exception to different printed logos 135 and 145 on the front of tokens 130 and 140, respectively, different locations of the tokens, and different rotations of the tokens. Token 140 is illustrated at a relatively distant location from device 110 as compared to token 130. Device 110, analyzing an image captured by the camera device of device 110, can determine that token 140 is more distant than token 130. Further, programming upon or available to device 110 can be calibrated to estimate an actual distance from the device for a particular token configuration based upon how the token appears in the captured image. Image recognition can be assisted by using a token or tokens of uniform dimensions, for example, with a token face including a uniform one meter diameter face, such that an appearance of the token in an image permits robust interpretation of a distance from the token to the associated camera device. Token 140 is illustrated facing directly toward device 110, whereas token 130 is illustrated facing partially to one side. Device 110, analyzing the image, can determine rotational orientations of each of the tokens. Device 110, for instance, can analyze an appearance of logo 135 printed on a token 130 and further can analyze boundary 131 of token 130 to determine a rotational orientation of token 130. Further, device 110, analyzing the tokens and printed logos upon each of the tokens, can determine an identity of each token, with the exemplary token 130 being identified as item "A" and exemplary token 140 being identified as item "B". Whereas tokens A and B are provided in the disclosure as examples of images that may be recognized on tokens, any number of printed graphics, logos, images, or other recognizable patterns can be programmed or trained in a computerized device for use as a token in processes disclosed herein.

Device 110 analyzes an image or a series of images, and processed data related to tokens 130 and 140 are available as spatial inputs to programming on or available to device 110. Device 110 shows a pair of images 132 and 142 showing exemplary cars. Image 132 corresponds to a spatial input provided by token 130, such that the illustrated car is relatively close in the illustrated scene, and the car in image 132 is rotated partially to one side. Similarly, image 142 corresponds to a spatial input provided by token 140, such that the illustrated car is relatively distant in the illustrated scene, and the car in image 142 is facing directly toward the viewer. Images 132 and 142 can be dynamically updated, for example, if the perspective of the tokens to the camera device changes, the displayed three dimensional model graphics representing the exemplary cars can be updated. The example of FIG. 3 includes graphical images directly corresponding to locations of visible tokens. However, such an output need not directly correspond to spatial inputs provided by the tokens. For example, a sailing simulation could be operated upon device 110, such that token 140 provides a wind direction relative to a boat, and token 130 provides a rudder position for the boat, with the display providing a resulting simulated operation of the boat. A number of uses for spatial inputs provided by a plurality of tokens are envisioned, and the disclosure is not intended to be limited to the particular examples provided herein.

Figure 4:
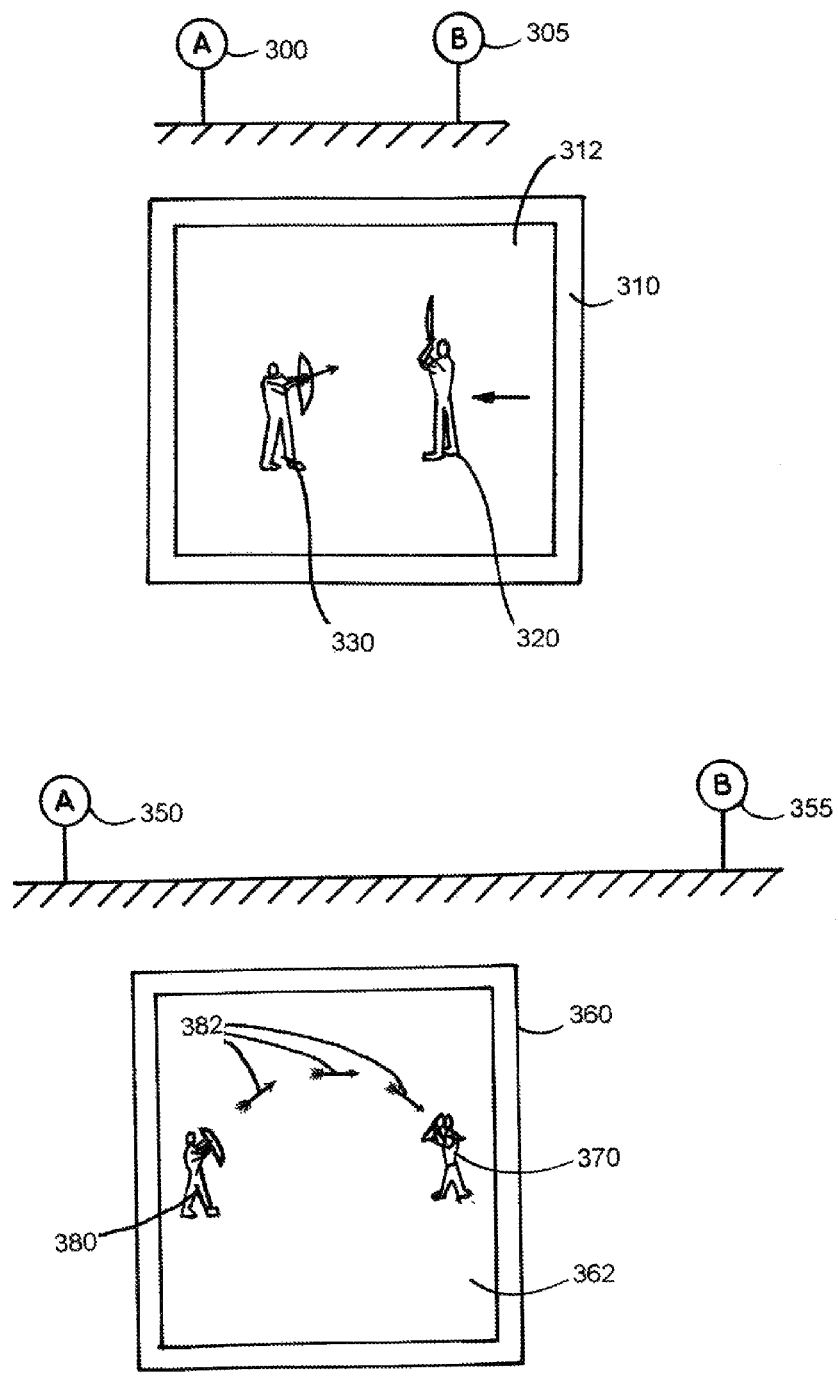
FIG. 4 illustrates relative locations of a pair of tokens, with differing output results on a portable computerized device based upon the locations of the pair of tokens, in accordance with the present disclosure.

Tokens can be placed in real world environments, and the recognized tokens can be inputs to an algorithm. Based upon the relative positions of the tokens, an application on the portable computerized device can determine an outcome for a virtual situation, and a result displayed on the portable computerized device can depend upon the inputs. Such virtual results based upon real world locations of tokens can have wide ranges of uses. Constraints and rules from an application upon a portable computerized device can be combined with inputs from the real world to generate a virtual world based upon the real world. FIG. 4 illustrates relative locations of a pair of tokens, with differing output results on a portable computerized device based upon the locations of the pair of tokens. In a top portion of FIG. 4, tokens 300 and 305 are located relatively close to each other and are labeled with clearly identifiable graphics thereupon, enabling a portable computerized device 310 to easily determine relative locations of the tokens to device 310. An application upon portable computerized device 310 utilizes the relative locations of tokens 300 and 305 to determine an outcome in an algorithm stored within the application. Two animated characters 320 and 330 are illustrated upon a view screen 312 of device 310. In the illustrated embodiment of the top portion of FIG. 4, character 320 is a swordsman, and character 330 is an archer. In the algorithm stored within the portable computerized device 310, the proximity of the tokens provides an advantage to swordsman of character 320, so the swordsman is illustrated quickly closing with the archer of character 330.

The bottom portion of FIG. 4 is similar to the top portion of FIG. 4, except that tokens 350 and 355 are located relatively distant from each other. An application upon portable computerized device 360 utilizes the relative locations of tokens 350 and 355 to determine an outcome in an algorithm stored within the application. Two animated characters 370 and 380 are illustrated upon a view screen 362 of device 360. In the illustrated embodiment of the bottom portion of FIG. 4, character 370 is a swordsman, and character 380 is an archer. In the algorithm stored within the portable computerized device 360, the proximity of the tokens provides an advantage to archer of character 380, so the swordsman is illustrated being overwhelmed by the arrows 382 of the archer of character 330.

Figure 5:
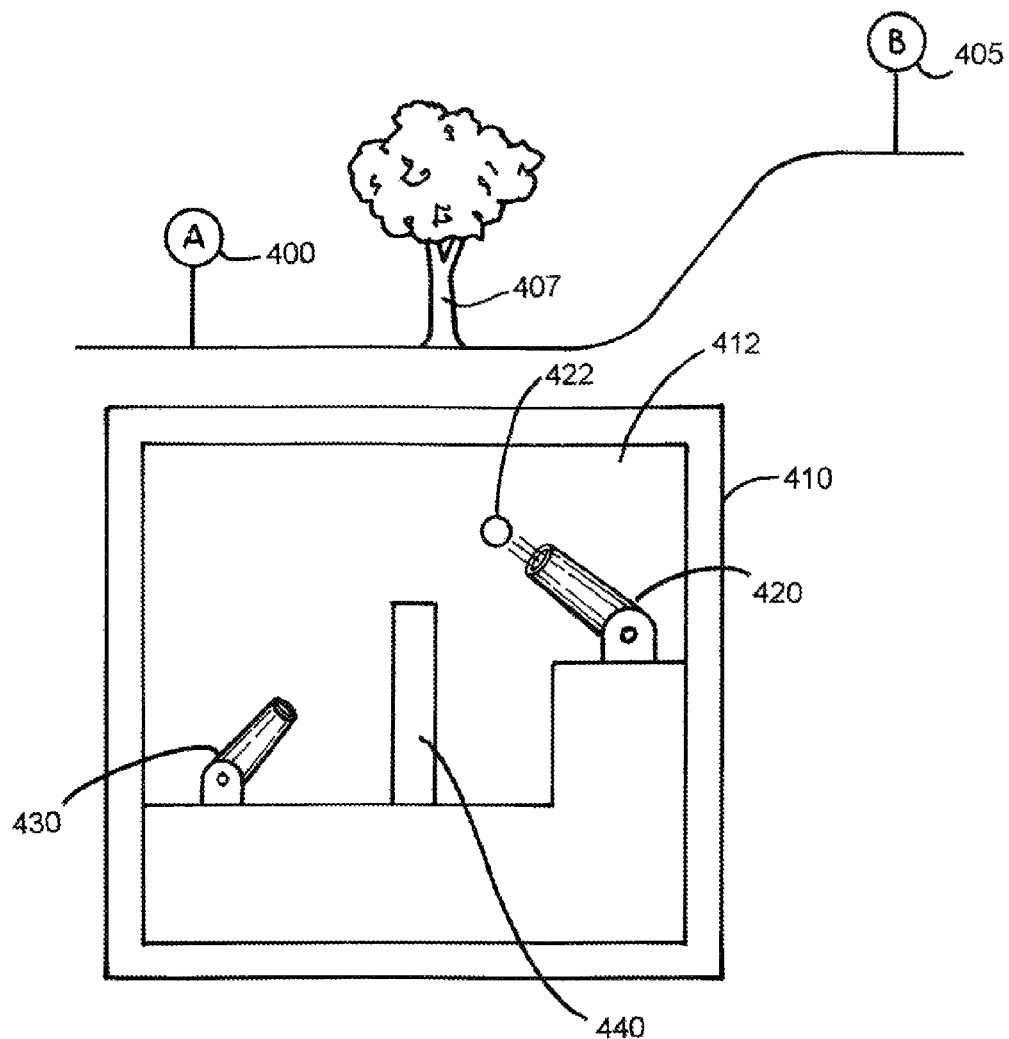
FIG. 5 illustrates a pair of tokens located at different heights in a real world environment, an object detected in proximity to the tokens, and a portable computerized device running an application displaying an output result based upon the heights of the tokens and the detected object, in accordance with the present disclosure.

Height differences in a real world environment and objects detected in the real world environment can also be used as inputs. FIG. 5 illustrates a pair of tokens located at different heights in a real world environment, an object detected in proximity to the tokens, and a portable computerized device running an application displaying an output result based upon the heights of the tokens and the detected object. Tokens 400 and 405 are illustrated, wherein token 400 is located at a lower elevation than token 405. Through methods disclosed herein, an application upon portable computerized device 410 can determine locations of the tokens in relation to device 410. Further, through image recognition methods known in the art, tree 407 located between tokens 400 and 405 can be identified as an input to the application. Two virtual cannons 420 and 430 are displayed upon view screen 412 of portable computerized device 410, with the locations of the cannons being determined based upon the detected locations of the tokens. Cannon 420 is illustrated firing cannonball 422. A virtual wall 440 is illustrated based upon the location and size of the detected tree 407. An advantage can be given to the higher cannon 420 based upon the height of token 405 with relation to token 400, or an advantage can be given to cannon 430 based upon a position of token 400 to tree 407. Physics approximating real world physics can be used in the application. In addition or in the alternative, fictional physics can be input or modulated through the application of portable computerized device 410. Gravity or wind speed can be changed to alter the results of the application.

FIGS. 4 and 5 are illustrated as fictional games. These game embodiments for applications upon a portable computerized device are given for ease of explanation, however, many practical and utilitarian applications are envisioned, and the disclosure is not intended to be limited to the particular examples provided herein.

Figure 6:
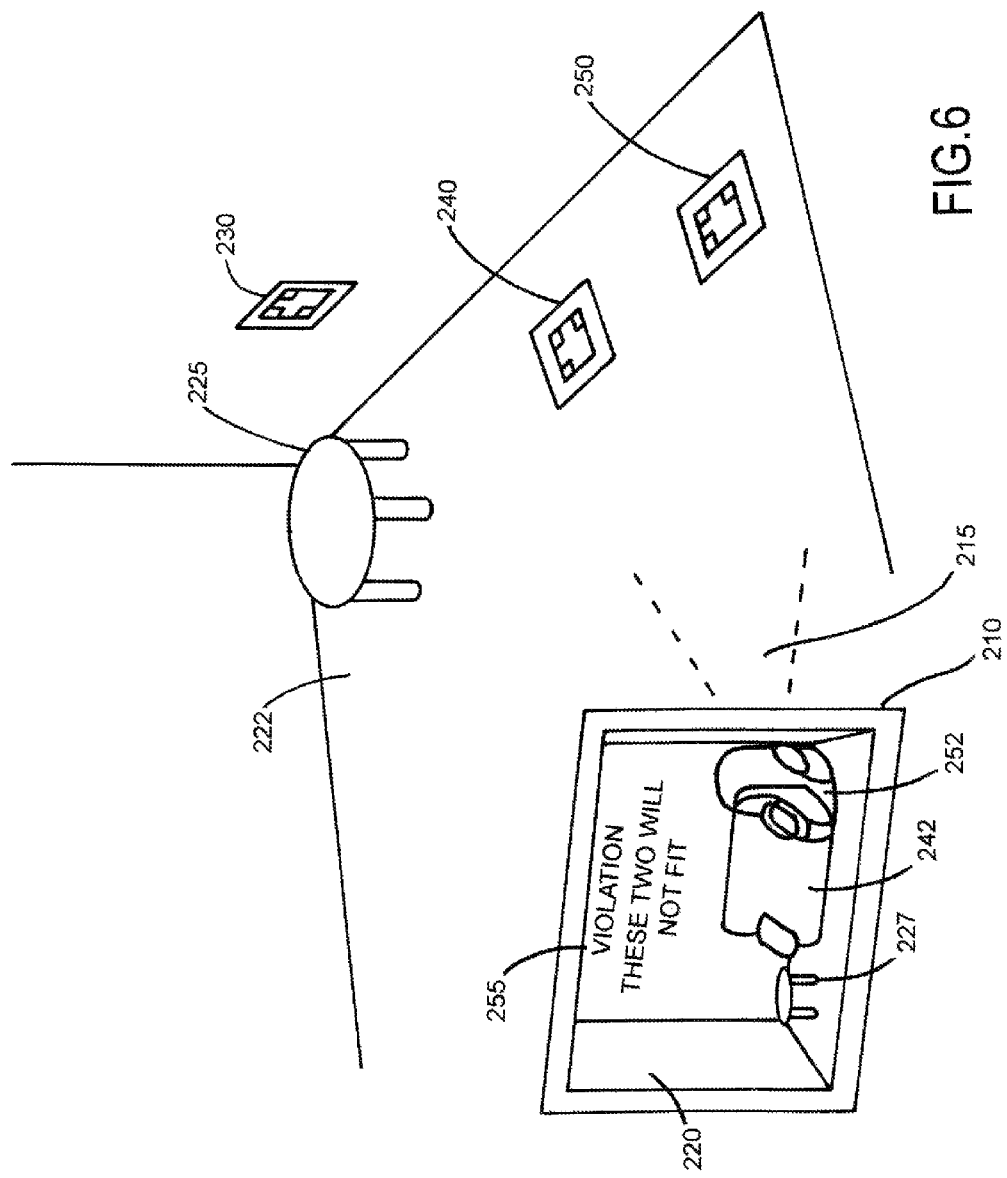
FIG. 6 illustrates a room including furniture and an exemplary portable computerized device displaying upon a view of the room a plurality of virtual pieces of furniture located based upon a plurality of tokens within the room, in accordance with the present disclosure.

FIG. 6 illustrates a room including furniture and an exemplary portable computerized device displaying upon a view of the room a plurality of virtual pieces of furniture located based upon a plurality of tokens within the room. Device 210 is illustrated including a camera device with a field of view 215. Room 222 is illustrated within field of view 215. Tokens 230, 240, and 250 are illustrated embodied as QR codes printed on sheets of paper. A token can be used to designate a package size or floor area that is associated with an item. In another example, a graphical rendering of an object can be associated with a token. In the example of FIG. 6, graphical renderings associated with tokens 240 and 250 can be used to permit a user to see what furniture or interior design elements would look like in a room without physically making any changes to the room. In one embodiment, tokens 240 and 250 can be used to represent a couch and an easy chair, respectively. A user can use the tokens to create virtual representations of the furniture superimposed over an image of the room to see what the furniture would look like in the room. In another embodiment, the tokens can be used to evaluate whether the furniture would fit within a given space in the room. In one embodiment, token 230 and similar tokens placed upon walls could be used to permit the device to define boundaries of a given space, and parameters programmed in association with a token 240, such as a package size, can provide boundaries of a perspective couch. By comparing the size of the space to the parameters of the object or objects associated with a token or a plurality of tokens, an evaluation of whether objects will fit into an identified floor space can be displayed as graphic 255. Further, actual objects in the space 225 can be displayed as image 227 in the space, and, in one embodiment, image recognition programming can be used to determine how object 225 affects virtual objects being evaluated by device 210.

Tokens corresponding to different aspects of interior design can be downloaded from the Internet and used to evaluate different options for a room. For example, a token can be used to represent a paint color for a wall, and a portable computerized device can illustrate the selected color upon the wall. A user could walk through the room with the device, and based upon location data or spatial input from one or more tokens, the user can see in three dimensions what the room would look like. Rules can be programmed or entered into the program, for example, permitting selection of some options and prohibiting the selection of other options. For example, a building owner could make selections of colors, styles, and fixture options that are preferred, and an interior designer could use a device with the preferences loaded thereupon to evaluate options for a room with a three dimensional augmented reality program, utilizing a plurality of tokens to make selections and set parameters for the illustrated space. A button can be provided to the interior designer capture images or video clips of created spaces to use later for a presentation to the building owner. A number of configurations for building, remodeling, customizing, and furnishing a room or a series of rooms are envisioned, and the disclosure is not intended to be limited to the particular examples provided herein.

Figure 7:
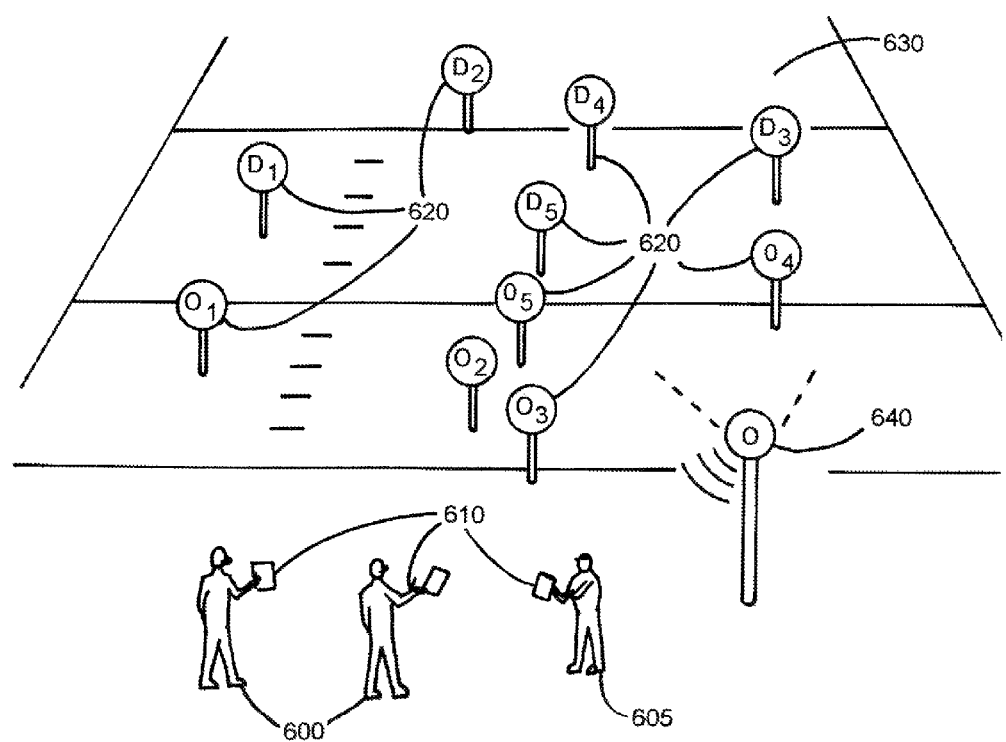
FIG. 7 illustrates a sports team utilizing portable computerized devices to review locations of players upon a field and to simulate outcomes of plays based upon the locations of tokens placed upon the playing field, in accordance with the present disclosure.

FIG. 7 illustrates a sports team utilizing portable computerized devices to review locations of players upon a field and to simulate outcomes of plays based upon the locations of tokens placed upon the playing field. Football players 600 and coach 605 each utilize a portable computerized device 610. Tokens 620 are placed upon field 630. Each of the players and the coach can walk around the field to view in three dimensions static locations of the players or simulated results of action upon the field. Generic players can be used, or statics for the team and/or the statistics of an upcoming opponent can be programmed into an application being run upon the portable computerized devices 610. Reactions of a particular player viewed in game tapes can be programmed into the application. Players 600 and coach 605 can view repetitively how a historical play was executed, and reactions of particular players can be altered to show how a player could have reacted to generate a different outcome. Coach 605 can walk out and show how the results might have differed if a player was lined up in a different position by changing the location of one of tokens 620. Similarly, different options can be presented to the coach, for example, showing how the play would have proceeded had the defense played zone instead of man to man. In addition to historical data from how players moved in a particular event, simulated results can be operated according to programming known in the art. Each of the portable computerized device 610 can view the locations of the tokens, however, because of the widely dispersed tokens 620 and the impact of a location of one token can have a dramatic impact upon a simulated result of a play, an elevated camera 640 is illustrated with a view of the entire field 630. A relationship of each of the devices 610 can be determined in relation to camera 640, and applications upon the devices 610 can acquire relative locations of the tokens 620 through camera 640, for example, through a wireless communications network. In another embodiment, a plurality of cameras can be utilized, and a map of the locations of tokens 620 can be synthesized by the inputs of the various cameras. In one embodiment, a player can wear a token on the back of his jersey, and an exemplary running back can run a route on the field, return to a computerized device, and see where he would have been tackled based upon his execution.

Figure 8:
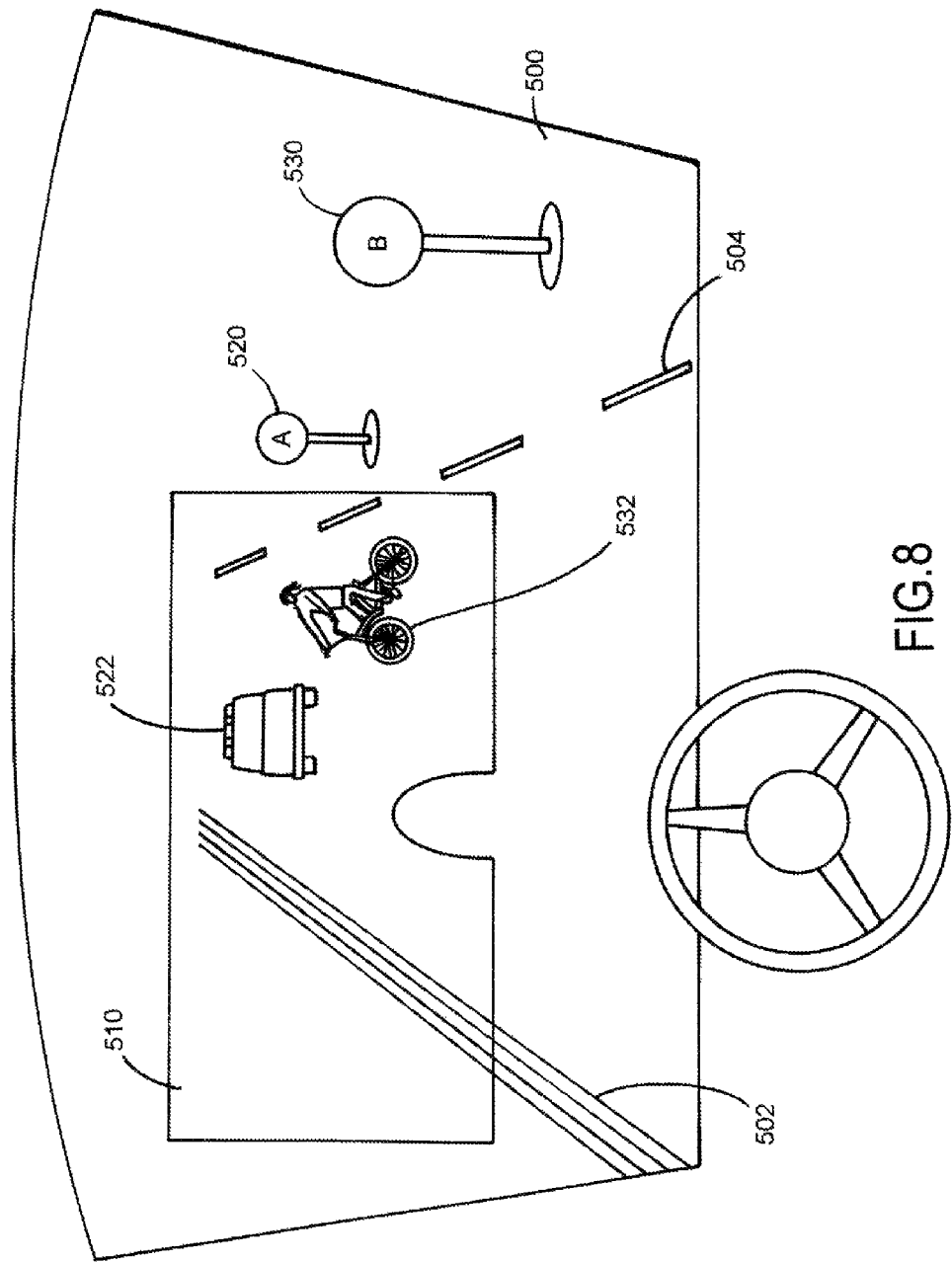
FIG. 8 illustrates an exemplary paid of eyeglasses including a processor and configured to display images upon a view of a user displaying images useful for driver's education, in accordance with the present disclosure.

FIG. 8 illustrates an exemplary paid of eyeglasses including a processor and configured to display images upon a view of a user displaying images useful for driver's education. Windshield 500 is illustrated, through which a driver can view objects and road details. Road markers 502 and 504 are illustrated upon the roadway. Eye glasses 510 are illustrated, wherein the glasses are equipped with a processor and are configured to project graphics upon a view of the user. Tokens 520 and 530 are illustrated upon the roadway. Graphics 522 and 532 corresponding to tokens 520 and 530, respectively, can be projected upon glasses 510 according to processes disclosed herein for the purpose of exposing the driver to obstacles and driving situations that would be difficult or dangerous to create in the real world.

Figure 9:
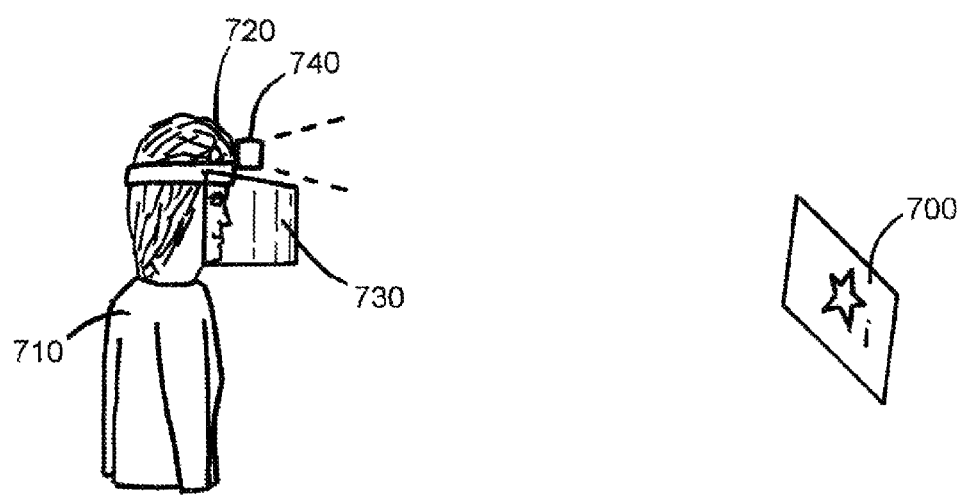
FIG. 9 illustrates use of a portable computerized device embodied as an exemplary visor device, in accordance with the present disclosure.

FIG. 9 illustrates use of a portable computerized device embodied as an exemplary visor device. Fighter pilots are known to use a visor system to display images to the user. The methods disclosed herein can be similarly used upon a visor device. Token 700 is illustrated, and user 710 is illustrated using a visor device 720. Visor device 720 includes technology known in the art for projecting graphics upon the visor and includes visor 730 capable of displaying graphics in the view of the user while still letting the user to view the surrounding environment. Visor device 720 further includes camera device 740 capable of capturing an image of token 700. Graphics upon the visor can be projected according to the methods disclosed herein based upon a location and orientation of the visor in relation to the token. The user could walk through a virtual zoo, walking among virtual tigers and elephants, all located and oriented according to a series of tokens.

Figure 10:
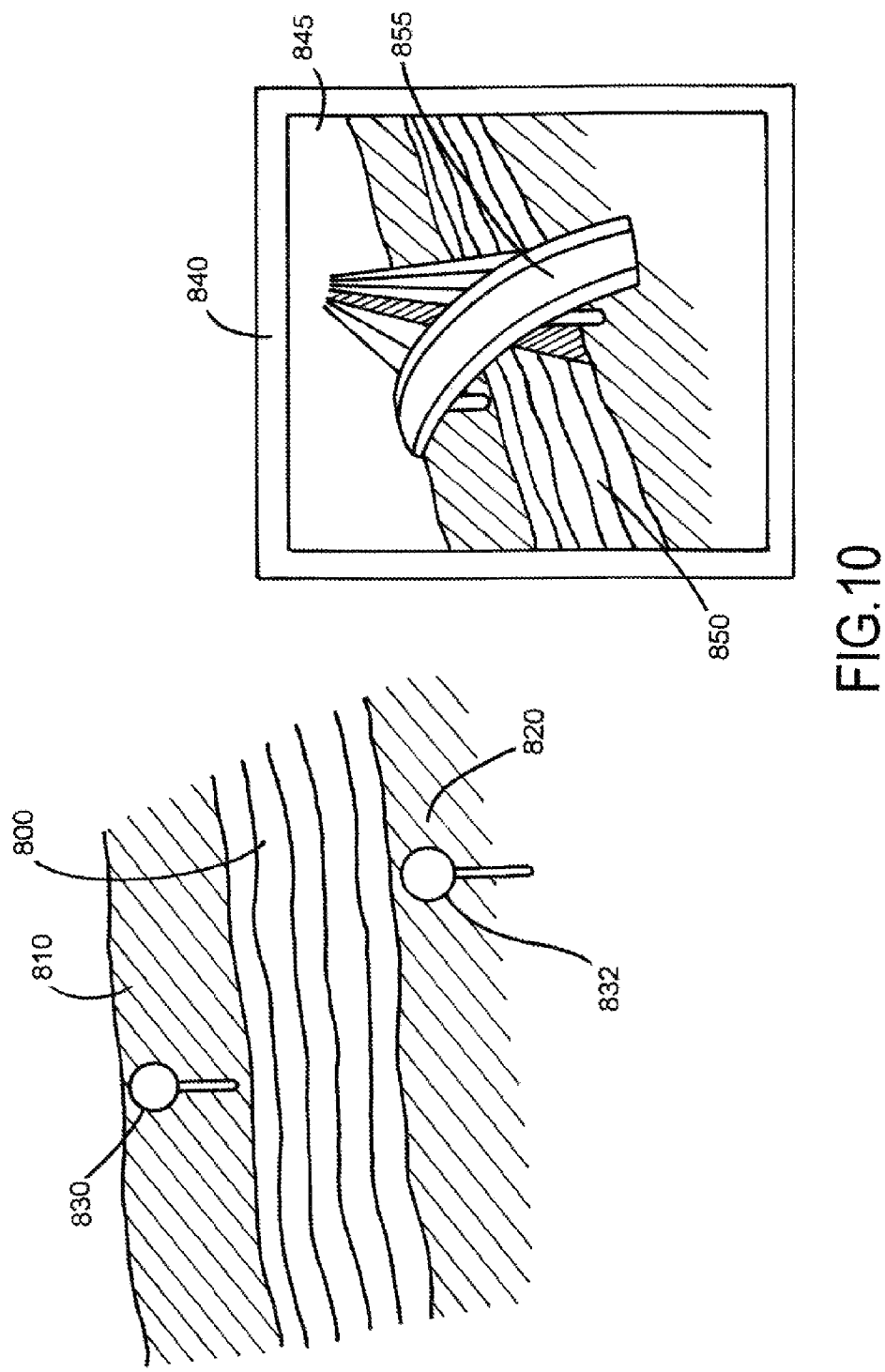
FIG. 10 illustrates exemplary use of a portable computerized device and a plurality of tokens to locate a large virtual construction project upon a landscape, in accordance with the present disclosure.

Simulations have long been used to show a location of a bridge, a building or other structure as it would look upon a particular landscape. Such simulations require that the landscape be modeled in high detail, with the landscape being FIG. 10 illustrates exemplary use of a portable computerized device and a plurality of tokens to locate a large virtual construction project upon a landscape. Actual river 800 is illustrated, including a near bank 820 and a far bank 810. A pair of tokens 830 and 832 is located upon the banks to provide a desired location and orientation of a virtual bridge that could be built across the river. In one embodiment, a token can be used to place a location of a virtual support column for the bridge. Portable computerized device 840 illustrates upon view-screen 845 a virtual bridge 855 spanning representation 850 of river 800. In this way, city planners could review a proposed location of a bridge based upon an actual view of the river and its banks without requiring that a detailed graphical model of the river be constructed. The bridge can be easily adjusted and moved to review different options, and the application can include programmed limitations based upon bridge construction requirements. Similar applications could show how a proposed home would look upon an empty lot or what a back yard would look like with a proposed deck or swimming pool.

Simulations can be performed on site using local geography, physics, engineering practices, and building codes defined in the model of the portable computerized device. An evaluation of a potential location for a power plant, hydroelectric dam, or water treatment plant that would take months when simulated by known processes can be performed in a single day with the methods disclosed herein. For example, wind turbines can be modeled including all of the physics needed to simulate turbine operation, and the portable computerized device can use the modeled turbines and the modeled physics to evaluate a physical location without modeling the physical location. For example, a turbine height can be evaluated and optimized based upon modeled wind currents for the physical environment. Trees, local hills, and other objects can be represented on site with a token and/or can be input to the computerized device through user input to the computerized device, by image recognition, by reference to a GPS signal and a 3D map database, or by any other means known in the art.

Figure 11:
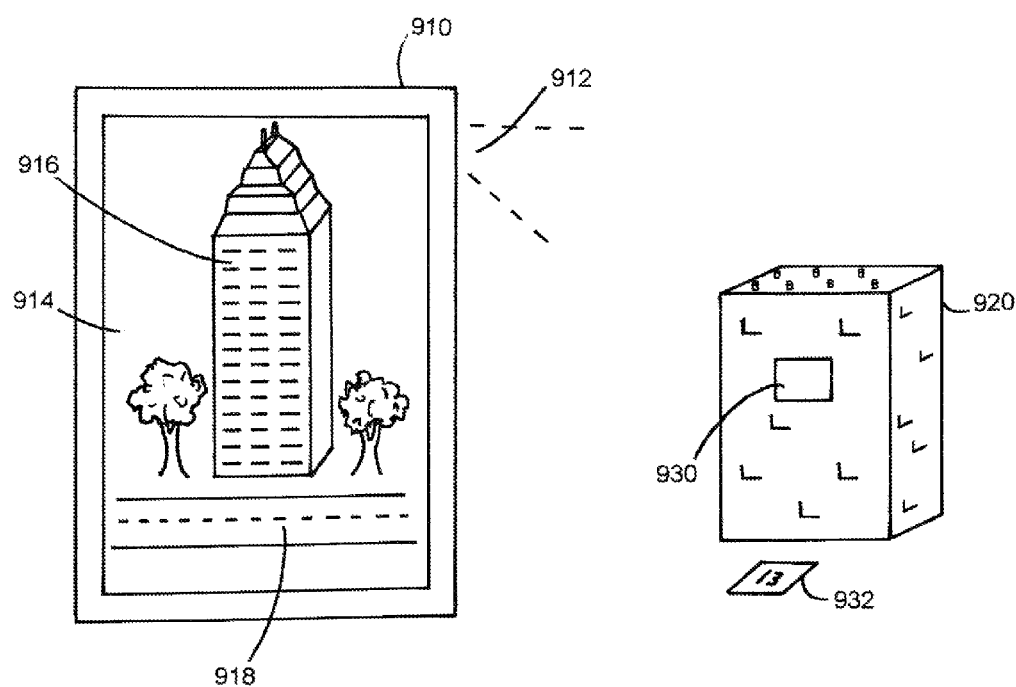
FIG. 11 illustrates an exemplary portable computerized device embodied as a tablet computer viewing a construction made of toy blocks, the construction including token, and rendering a graphic based upon the token, in accordance with the present disclosure.

A token or tokens recognizable to an augmented reality program can be used with a modular product or product that includes building blocks or other assembled features to provide an augmented reality experience related to the modular product to a viewer. FIG. 11 illustrates an exemplary portable computerized device embodied as a tablet computer viewing a construction made of toy blocks, the construction including token, and rendering a graphic based upon the token. Construction 920 is a rectangular depiction of a structure that can be made out of building blocks, for example, as provided by Legos®. such building blocks frequently include interchangeable locking features that permit one block to be assembled to another block or groups of blocks. The exemplary rectangular construction is one structure that can be modeled or build out of building blocks. Blocks are known to include solid blocks, hollow blocks, curved blocks, blocks with holes, hinges, and matching moving parts. Any number of shapes or configurations of building or other construction are possible, and the disclosure is not intended to be limited to the particular embodiments disclosed herein. An optional additional token 932 is provided enabling additional features to be input to a device based upon the token.

Construction 920 is illustrated with token 930 attached thereto. Token 930 can be a sticker with adhesive backing, a plate magnetically attached to construction 920, or some other faceplate device attached by other methods known in the art. Token 930 can be configured as part of a building block, for example, painted, printed, etched, molded, or otherwise created upon the side of a block.

Portable computerized device 910 is illustrated including a camera view 912 capturing images in front of device 910 including construction 920. Device 910 includes display device 914. Display device 914 is illustrated showing a building 916 which is an output to an augmented reality program based upon token 930 as an input. Further, scenery 918 is illustrated around the building, provides as an output based upon token 932 as an input.

A set of building blocks can be initially configured to include an augmented reality program configured therewith, for example, with a compact disk including the programming included with the blocks or with an insert including a download page and an access code. Additionally or alternatively, an augmented reality program can be marketed or provided as an add-on to a toy, for example, encouraging a family to register toys online with the augmented reality program provided as a reward. Additionally or alternatively, augmented reality programs can be provided separately from a particular toy, for example, with a generic castle themed augmented reality program being generically available with stickers that can be placed upon anything to acts as tokens for the program.

The tokens and associated devices and methods can be used with any modular toy, building set, or similar configuration, including but not limited to Legos®, Lincoln Logs®, K'nex®, Mega Bloks®, Trio®, Superstructs®, and Fiddlestix®.

Figure 12:
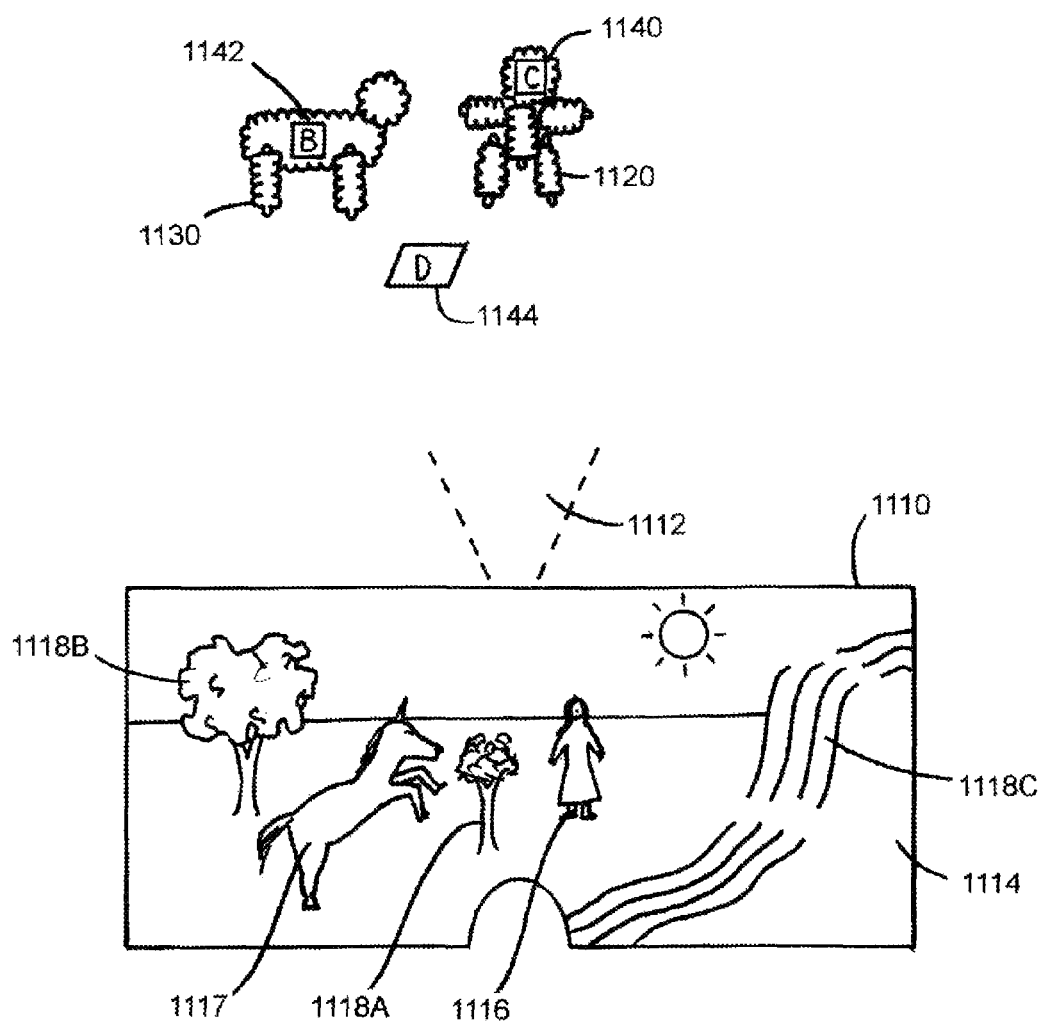
FIG. 12 illustrates an exemplary portable computerized device embodied as eyeglasses, the eyeglasses configured to project graphics upon a view of a user, viewing a construction made of interlocking members assembled as figurines, the figurines each including a token, and rendering a graphic based upon the tokens, in accordance with the present disclosure.

FIG. 12 illustrates an exemplary portable computerized device embodied as eyeglasses, the eyeglasses configured to project graphics upon a view of a user, viewing a construction made of interlocking members assembled as figurines, the figurines each including a token, and rendering a graphic based upon the tokens. Toys are known to include sets of interlocking features that a child can assemble into any number of shapes. FIG. 12 illustrates figurine 1120 and figurine 1130 constructed of interlocking members in forms that a child intends to be a princess and a unicorn, respectively. Figurine 1120 is illustrated with a token 1140, and figuring 1130 is illustrated with a token 1142. Tokens can be included or added as disclosed herein to the figures, enabling a child to view an augmented reality program based upon the figurines. The program can be static or dynamic, for example, with the figures changing only as the child moves the figurines or with a programmed storyline being presented to the child based upon which tokens are present. The program can be adaptive, for example, making decisions based upon how the tokens or associated figures are configured. If the child manipulates figurine 1120 such that it appears to be riding figurine 1130, the program can adjust to show a princess riding the unicorn. An additional token 1144 is provided, enabling the child to interact further with the figurines.

View 1110 through exemplary eyeglasses configured to project images into the view of the user is illustrated. The eyeglasses include a camera view 1112 which can capture images including figurines 1120 and 1130 and the associated tokens. Princess 1116 corresponding to token 1140 and unicorn 1117 corresponding to token 1142 are illustrated. Additional details 1118A, 1118B, and 1118C, embodied as a flower, a tree, and a waterfall, respectively, are illustrated. Token 1144 can be made to associate with one of the details, for example, flower 1118A, such that if a child moves token 1144 from being close to token 1140 to close to token 1142, the program can provide an output illustrating the princess 1116 giving flower 1118A to unicorn 1117. A number of embodiments of scenes that can be illustrated based upon input provided by tokens within a camera view of a portable computerized device are envisioned, and the disclosure is not intended to be limited to the particular examples provided herein.

Figure 13:
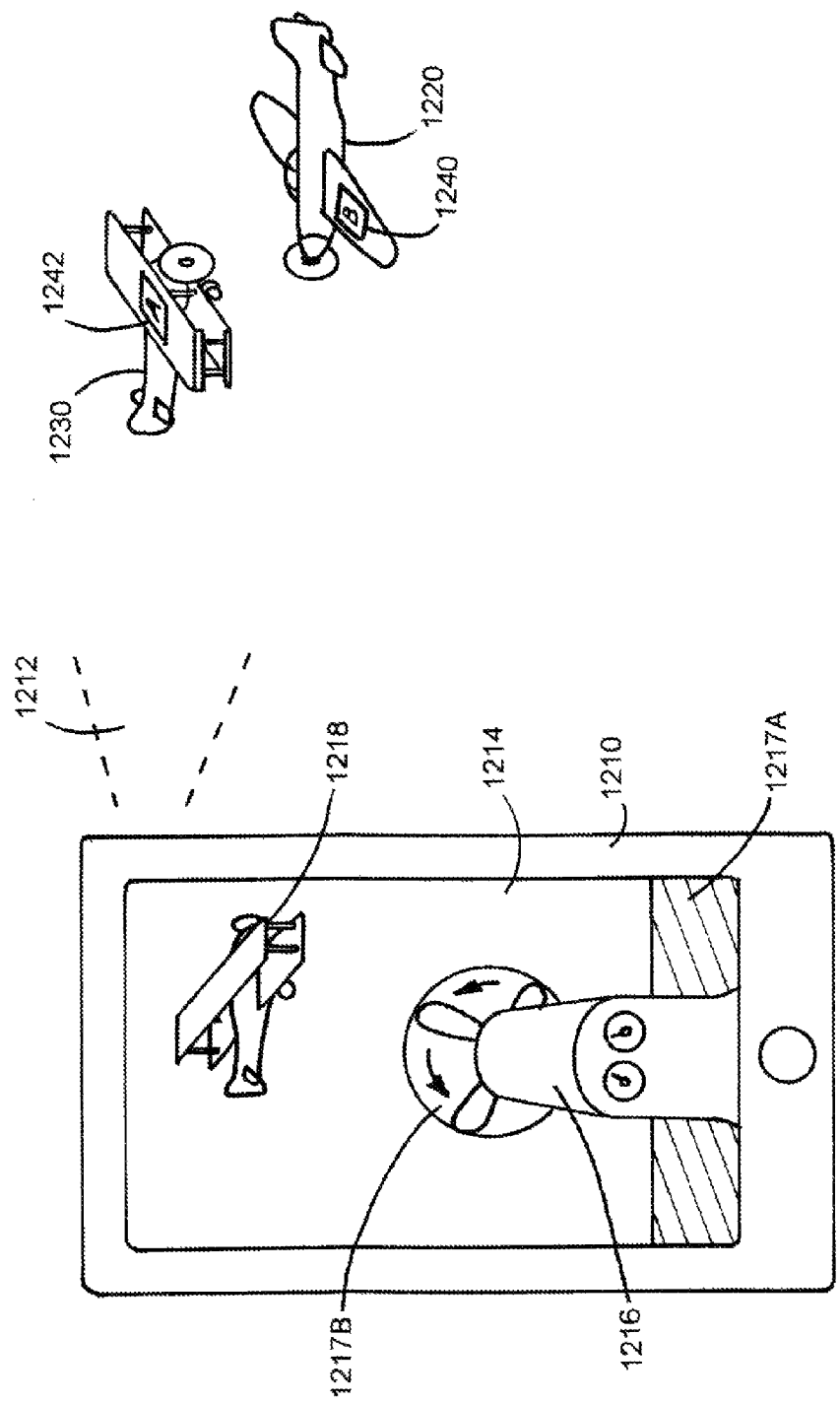
FIG. 13 illustrates an exemplary portable computerized device embodied as a smart-phone viewing a pair of die-cast toy vehicles, each of the vehicles including a token assembled thereto, and rendering an interactive graphic based upon the relative positions of the tokens, in accordance with the present disclosure.

FIG. 13 illustrates an exemplary portable computerized device embodied as a smart-phone viewing a pair of die-cast toy vehicles, each of the vehicles including a token assembled thereto, and rendering an interactive graphic based upon the relative positions of the tokens. Two die cast airplanes 1220 and 1230, embodied as a bi-plane and a mono-plane, respectively, are illustrated. Airplane 1220 includes token 1240 and airplane 1230 includes token 1242. The tokens 1240 and 1242 can be modular tokens, for example, embodied as a sticker that a child can put on the airplanes to make the toys recognizable by an augmented reality program. Device 1210 is illustrated, including camera view 1212 capturing images of airplanes 1220 and 1230. Based upon tokens 1240 and 1242, an augmented reality program on device 1210 can provide a graphical output upon display 1214. In one exemplary embodiment, a user of device 1210 can be a pilot to one of the airplanes. Airplane 1216 corresponding to token 1240 is illustrated, including wings 1217A and spinning propeller 1217B. Based upon manipulation of airplanes 1220 and 1230 and the resulting manipulation of the tokens associated therewith, the augmented reality program of device 1210 can provide a dynamic output.

Figure 14:
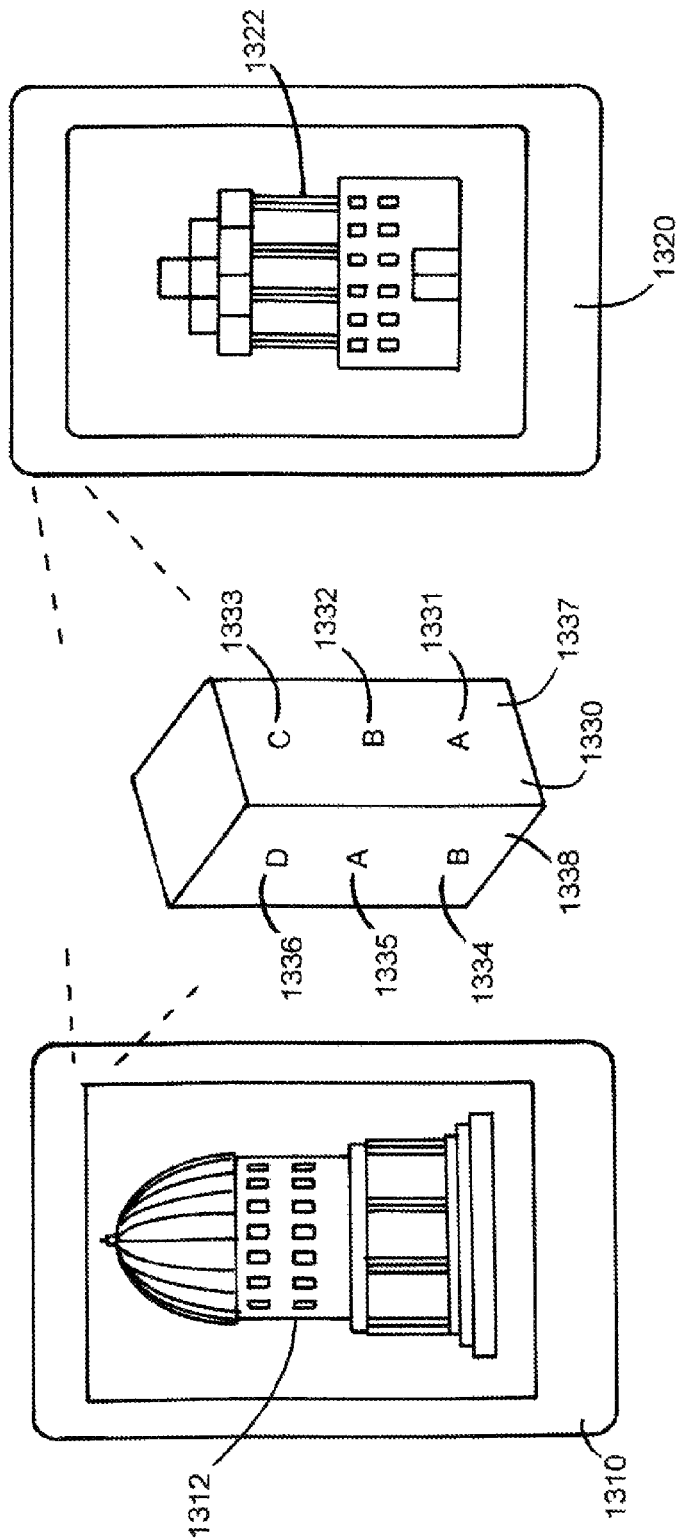
FIG. 14 illustrates a pair of portable computerized devices, each looking at a construction made of toy blocks, wherein the toy blocks have different tokens visible from different angles and the resulting graphics rendered upon the devices is dependent upon the particular viewing angle in relation to the blocks, in accordance with the present disclosure.

FIG. 14 illustrates a pair of portable computerized devices, each looking at a construction made of toy blocks, wherein the toy blocks have different tokens visible from different angles and the resulting graphics rendered upon the devices is dependent upon the particular viewing angle in relation to the blocks. Different children using two devices 1310 and 1320 can play together, making the same construction 1330, while experiencing different graphical outputs upon their devices. Device 1310 is illustrated capturing images if construction 1338 including construction face 1338. Face 1338 includes three tokens, 1334, 1335, and 1336. As the child is constructing construction 1330, he or she can select from a group of tokens, based upon an exemplary architectural style or styles that the child wishes to see displayed upon the device. Image 1312 is illustrated upon device 1310, with three different architectural styles upon image 1312 corresponding to three tokens 1334, 1335, and 1336 visible to device 1310. Similarly, device 1320 includes an image 1322 of a building based upon three tokens 1331, 1332, and 1333 visible to device 1320 upon face 1337.

Figure 15:
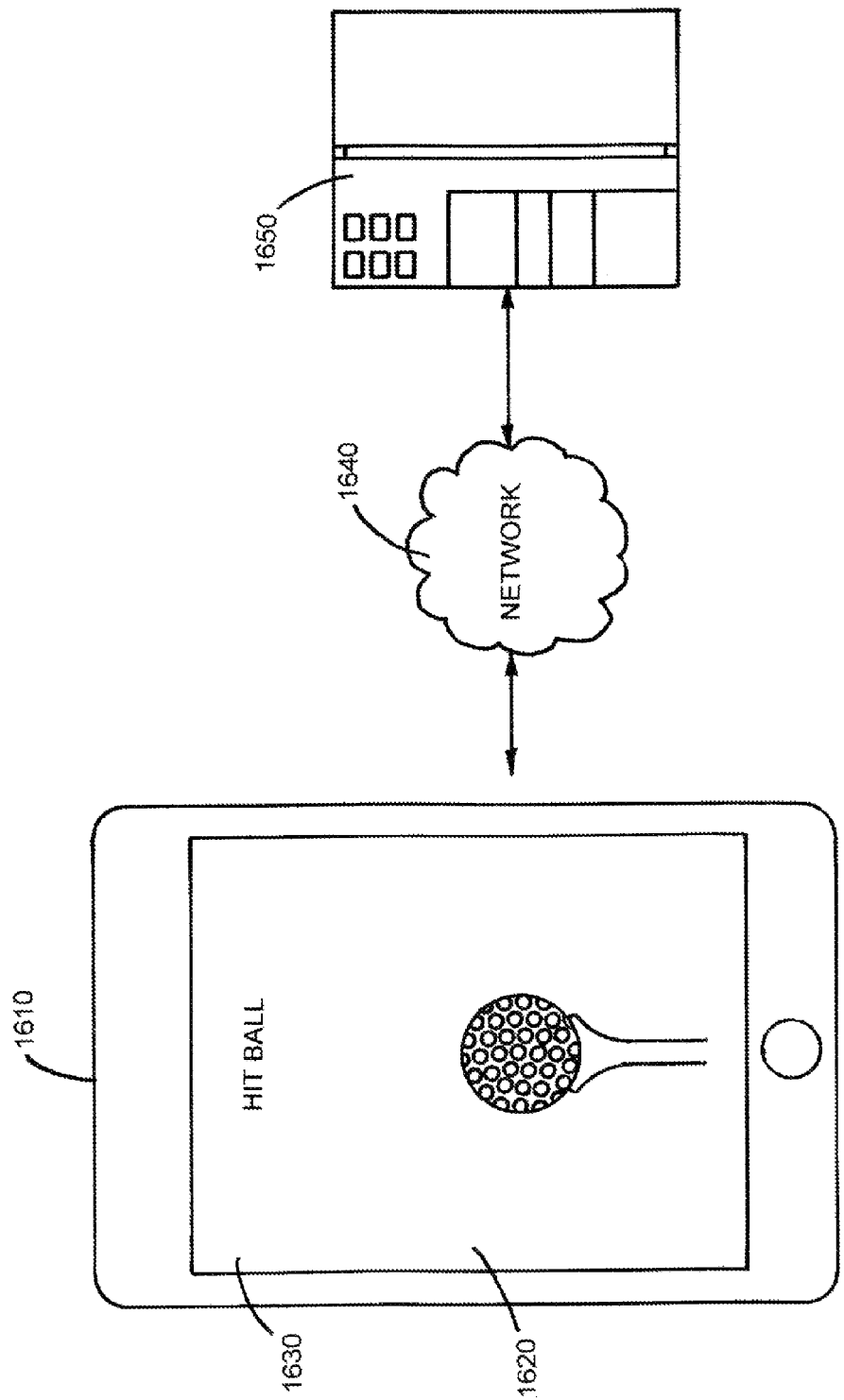
FIG. 15 is a schematic illustrating an exemplary portable computerized device in communication with an exemplary three dimensional model server, in accordance with the present disclosure.

FIG. 15 is a schematic illustrating an exemplary portable computerized device in communication with an exemplary three dimensional model server. Portable computerized device 1610 is illustrated, including illustrated graphics 1630 displayed upon a graphical user interface 1620 of device 1610. Device 1610 can include a camera device, and an image or a series of images creating a video feed can be displayed including an object displaying a token image. Device 1610 is an exemplary portable computerized device including input devices configured to gather information and a processor configured to make determinations regarding data from the input devices. Server 1650 is illustrated including a remote computerized system with modules operating to process information gathered from device 1610 and enable operation of a three dimensional model. Server 1650 and device 1610 are in communication through exemplary wireless communications network 1640. Illustrated graphics 1630 illustrate an embodiment whereby a golf simulation can be operated. In one embodiment, a user could place a number of tokens around a room indicating features of a putting green or features upon the ground. In one embodiment, accelerometers or other sensors within device 1610 or optical sensors viewing movement of the user could be used to permit the user to simulate a golf swing. A physics model with behavior of a golf ball, dynamics of a golf swing, behavior of a ball on particular ground features, etc. could be programmed upon device 1610 or within server 1650, such that movement of the golf ball can be simulated based upon the sensed swing of the user. A token or a plurality of tokens captured by a camera device of device 1610 can be used to configure a virtual golf course surface.

Figure 16:
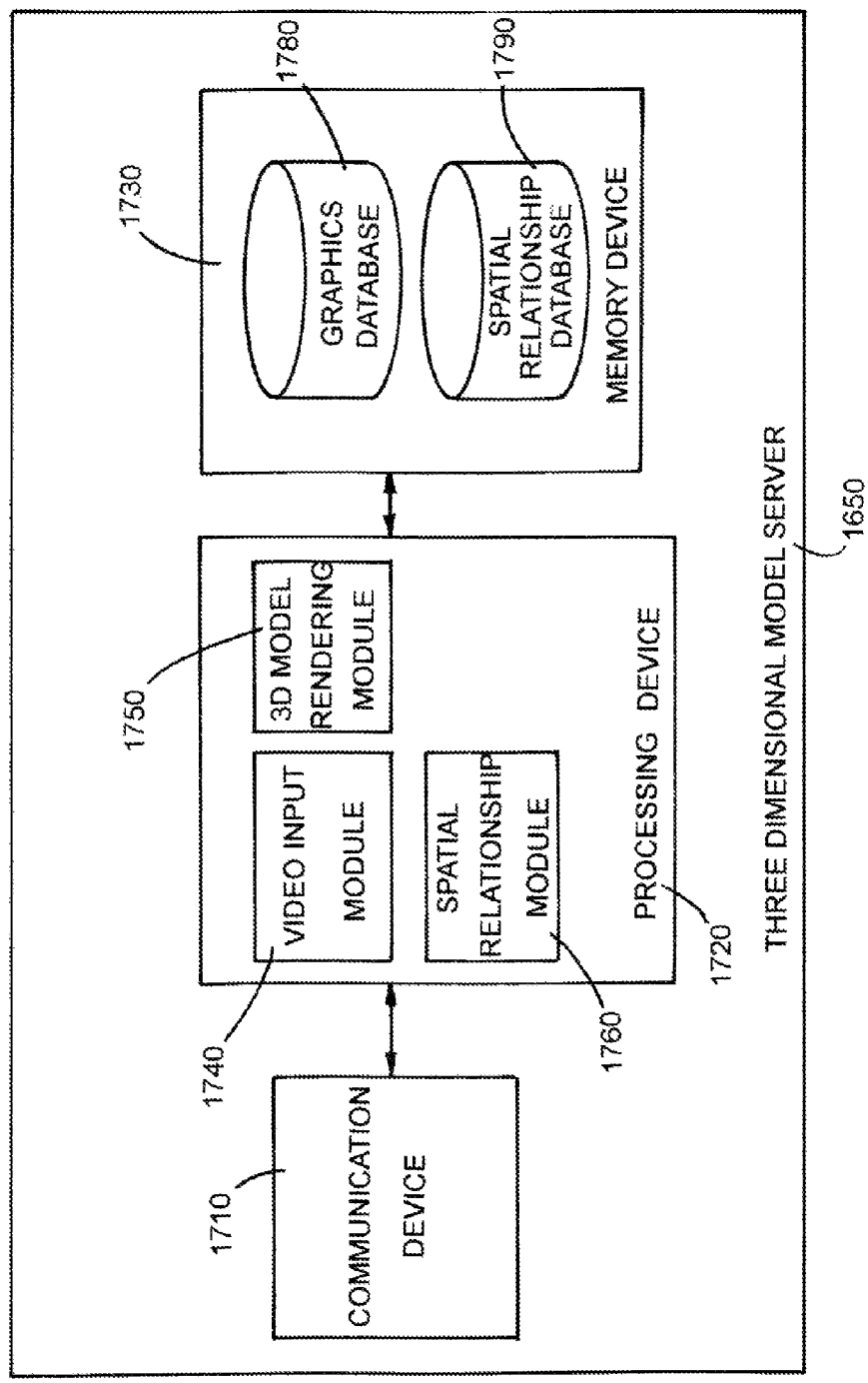
FIG. 16 is a schematic illustrating an exemplary three dimensional model server, in accordance with the present disclosure.

FIG. 16 is a schematic illustrating an exemplary three dimensional model server. In the illustrated embodiment, the server 1650 may include a processing device 1720, a communication device 1710, and memory device 1730.

The processing device 1720 can include memory, e.g., read only memory (ROM) and random access memory (RAM), storing processor-executable instructions and one or more processors that execute the processor-executable instructions. In embodiments where the processing device 1720 includes two or more processors, the processors can operate in a parallel or distributed manner. In the illustrative embodiment, the processing device 1720 executes one or more of a video input module 1740, a 3D model rendering module 1750, and an spatial relationship module 1760. Depending upon the application being operated, a further module with programming to operate or facilitate the particular application can be included, for example, simulating a golf game, movement of football players, construction of a virtual bridge, etc.

The communication device 1710 is a device that allows the server 1650 to communicate with another device, e.g., a portable computerized device 1610 through a wireless communication network connection. The communication device 1710 can include one or more wireless transceivers for performing wireless communication and/or one or more communication ports for performing wired communication.

The memory device 1730 is a device that stores data generated or received by the server 1650. The memory device 1730 can include, but is not limited to a hard disc drive, an optical disc drive, and/or a flash memory drive. Further, the memory device 1730 may be distributed and located at multiple locations. The memory device 1730 is accessible to the processing device 1720. In some embodiments, the memory device 1730 includes a graphics database 1780 and an spatial relationship database 1790.

Graphics database 1780 can include files, libraries, and other tools facilitating operation of a 3D model. Spatial relationship database 1790 can include information enabling operation of a program to identify and analyze tokens, for example, including data permitting access to token sizes and image data enabling determination of token distances and token orientations and determining relationships of one token to another token.

The video input module 1740 can monitor information provided by device 1610 over network 1640, for example, including a series of images showing a token within a view of the device. Module 1740 can include programming to process the images, recognize the token within the images, determine a distance to and orientation of the token, and process the information as an input value or values to a 3D model.

Spatial relationship module 1760 includes programming to execute a program, including operation of rules, routines, and other relevant information required to determine an output based upon a spatial input or inputs. Module 1760 can access spatial relationship database 1790 to enable used of information stored on the database.

3D model rendering module 1750 receives data from modules 1740 and 1760 and database 1780, and module 1750 provides graphics, images, or instructions enabling display of a three dimensional model display upon device 1610.

Figure 17:
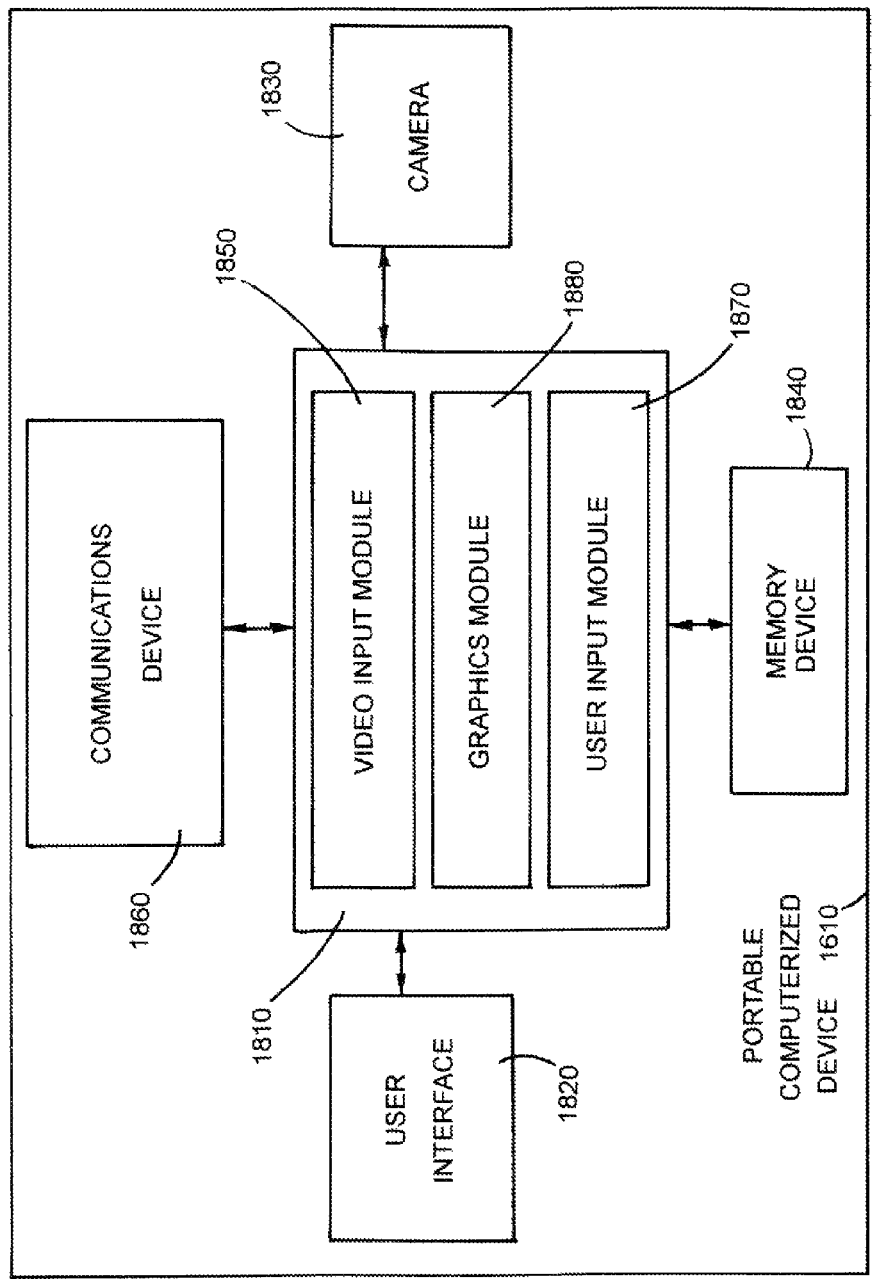
FIG. 17 is a schematic illustrating an exemplary portable computerized device configured to implement processes disclosed herein, in accordance with the present disclosure.

FIG. 17 is a schematic illustrating an exemplary portable computerized device configured to implement processes disclosed herein. Device 1610 includes a processing device 1810, a user interface 1820, a communication device 1860, a camera 1830, and a memory device 1840.

The processing device 1810 can include memory, e.g., read only memory (ROM) and random access memory (RAM), storing processor-executable memory (ROM) and random access memory (RAM), storing processor-executable instructions and one or more processors that execute the processor-executable instructions. In embodiments where the processing device 1810 includes two or more processors, the processors can operate in a parallel or distributed manner. In the illustrative embodiment, the processing device 1810 can execute the operating system of the portable computerized device. In the illustrative embodiment, the processing device 1810 also executes a video input module 1850, a user input module 1870, and graphics module 1880, which are described in greater detail below.

The user interface 1820 is a device that allows a user to interact with the portable computerized device. While one user interface 1820 is shown, the term "user interface" can include, but is not limited to, a touch screen, a physical keyboard, a mouse, a microphone, and/or a speaker. The communication device 1860 is a device that allows the portable computerized device to communicate with another device, e.g., server 1650. The communication device 1860 can include one or more wireless transceivers for performing wireless communication and/or one or more communication ports for performing wired communication. The memory device 1840 is a device that stores data generated or received by the portable computerized device. The memory device 1840 can include, but is not limited to, a hard disc drive, an optical disc drive, and/or a flash memory drive.

The camera 1830 is a digital camera that captures a digital photograph. The camera 1830 receives an instruction to capture an image and captures an image of a view proximate to the camera. The digital photograph can be a bitmap file. The bitmap file can be a bitmap, a JPEG, a GIF, or any other suitably formatted file. The camera 1830 can receive the instruction to capture the image from the processing device 1810 and can output the digital photograph to the processing device 1810.

Video input module 1850 monitors data from camera device 1830, which can include an image of a token. User input module 1870 can monitor input from the user related to manipulation of three dimensional model being operated. Graphics module 1880 can receive data from server 1650 and provide a display upon device 1610 related to operation of the model and the related program.

Embodiments in accordance with the present disclosure may be embodied as an device, process, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIGS. 15-17 illustrate an exemplary embodiment whereby a process to monitor location data related to a token or tokens is used to generate a three dimensional model graphic. Location data can include distances from tokens to the camera device, orientations of the tokens with respect to the camera device, a computed or inferred distance between tokens, a computed or inferred height difference between tokens, and other information that can be determined based upon an image of a token or a plurality of tokens. Tasks are split between the exemplary device and server according to one embodiment of the disclosure. However, other embodiments are disclosed. A portable computerized device can perform all of the necessary programming to operate processes disclosed herein. Operation of the 3D model can be operated on either the server or the device.

Figure 18:
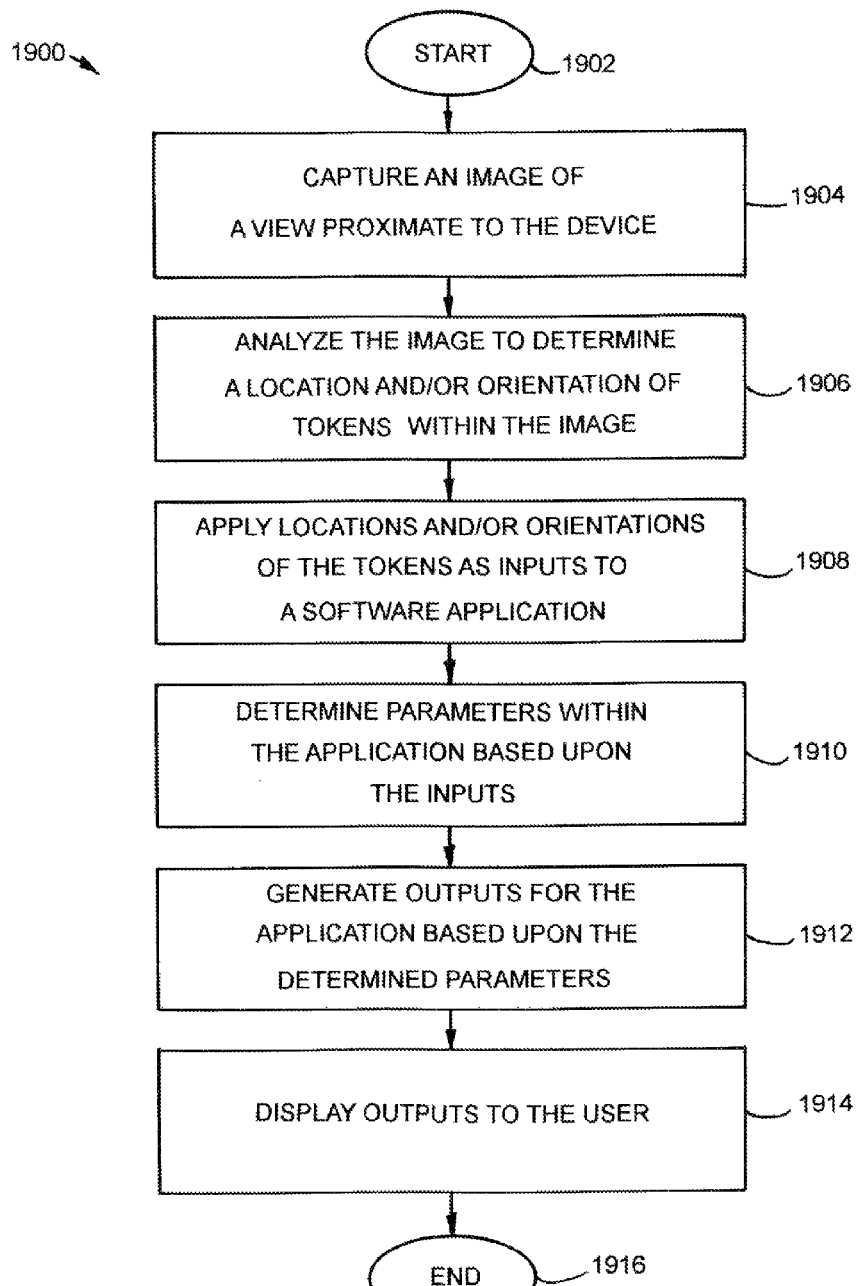
FIG. 18 is a flowchart illustrating an exemplary process utilizing a plurality of tokens to generate a display upon a computerized device, in accordance with the present disclosure.

FIG. 18 is a flowchart illustrating an exemplary process utilizing a plurality of tokens to generate a three dimensional model display upon a computerized device. Process 1900 starts at step 1902. At step 1904, an image of a view proximate to a device operating the process is captured. At step 1906, the image is analyzed to determine a location and/or an orientation of each of a number of tokens visible within the captured image. At step 1908, the locations and/or orientations determined at step 1906 are applied a spatial inputs to a software application being operated. At step 1910, parameters within the software application are determined based the spatial inputs. At step 1912, outputs are generated for the software application based upon the determined parameters. At step 1914, the outputs are displayed to a user of the software application. At step 1916, the exemplary process ends. A number of similar processes accomplishing various aspects and applications disclosed herein are envisioned, and the disclosure is not intended to be limited to the example provided herein.

Figure 19:
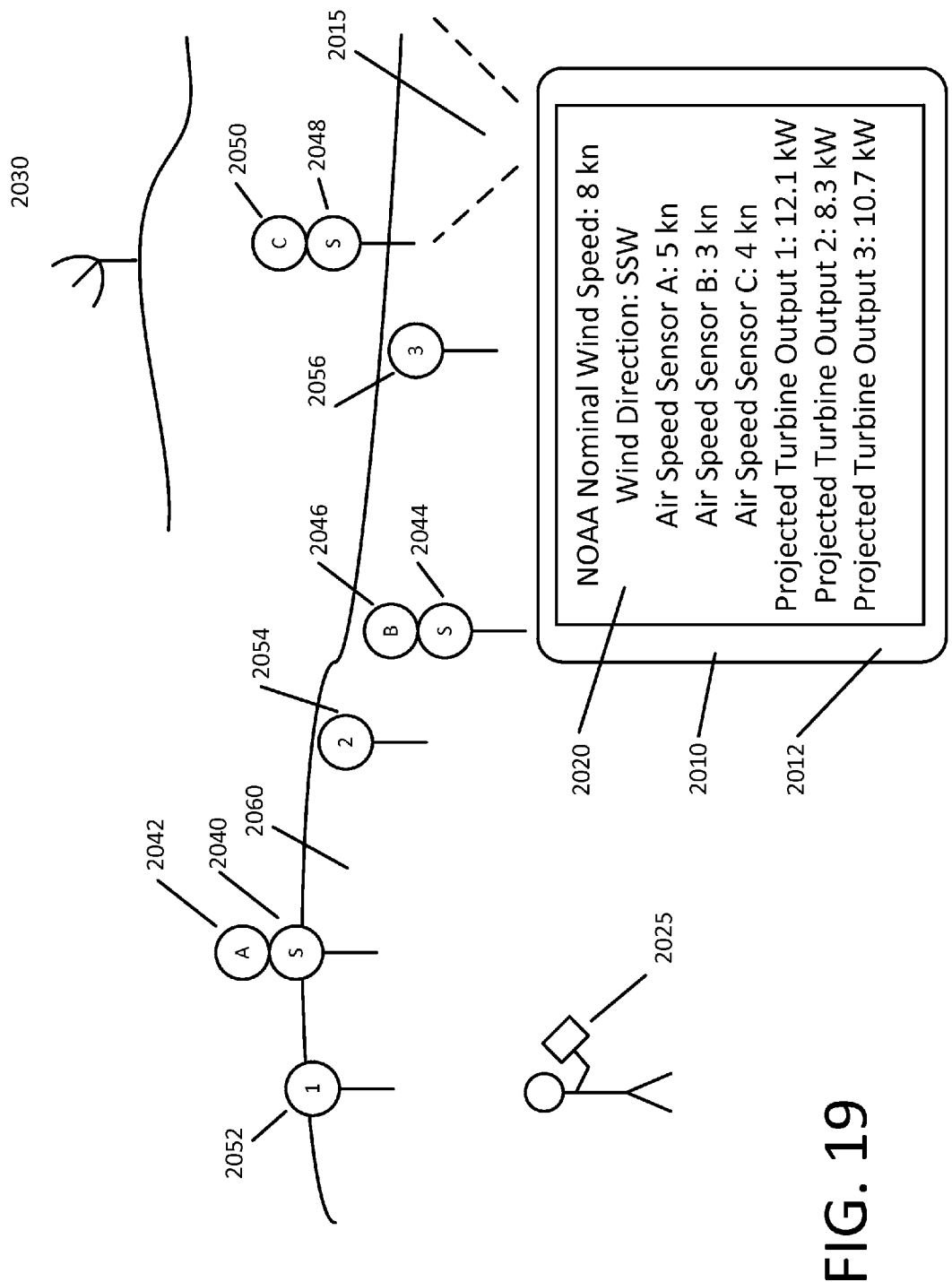
FIG. 19 illustrates a portable computerized device receiving information from a plurality of sources and generating an output based upon the information, in accordance with the present disclosure.

A device employing processes disclosed herein can be utilized to gather information from a wide variety of sources to provide a determined output to a user. For example, information available over a network, for example, information received from the Internet, can be combined with information gathered upon a first portable computerized device and information gathered upon a second portable computerized device, the combination of information being compiled and used to determine an output. FIG. 19 illustrates a portable computerized device receiving information from a plurality of sources and generating an output based upon the information. First portable computerized device 2010 is illustrated including a camera device capturing images from a field of view 2015 and a display providing information to a user of the device. Device 2010 further includes a communications device 2012 providing wireless communication to other devices or to a communications network according to methods known in the art. A plurality of tokens 2052, 2054, and 256 are illustrated representing candidate points on landscape 2060 where a wind turbine is being proposed for installation. A remote weather radar station 2030 is illustrated gathering data on wind patterns near landscape 2060. Further, a plurality of local wind speed sensors 2040, 2044, and 2048 are illustrated gathering air speeds at each respective location and can communicate with device 2010 according to methods known in the art. Each sensor 2040, 2044, and 2048 includes a respective token 2042, 2046, and 2050. Further, a second portable computerized device 2025 is illustrated gathering information. Based upon communication with the various devices and information sources and based upon engineering models loaded upon device 2010 related to the operation of wind turbines, device 2010 can predict wind patterns proximate to landscape 2060 and how a wind turbine would perform at each of locations 2052, 2054, and 2056.

Figure 20:
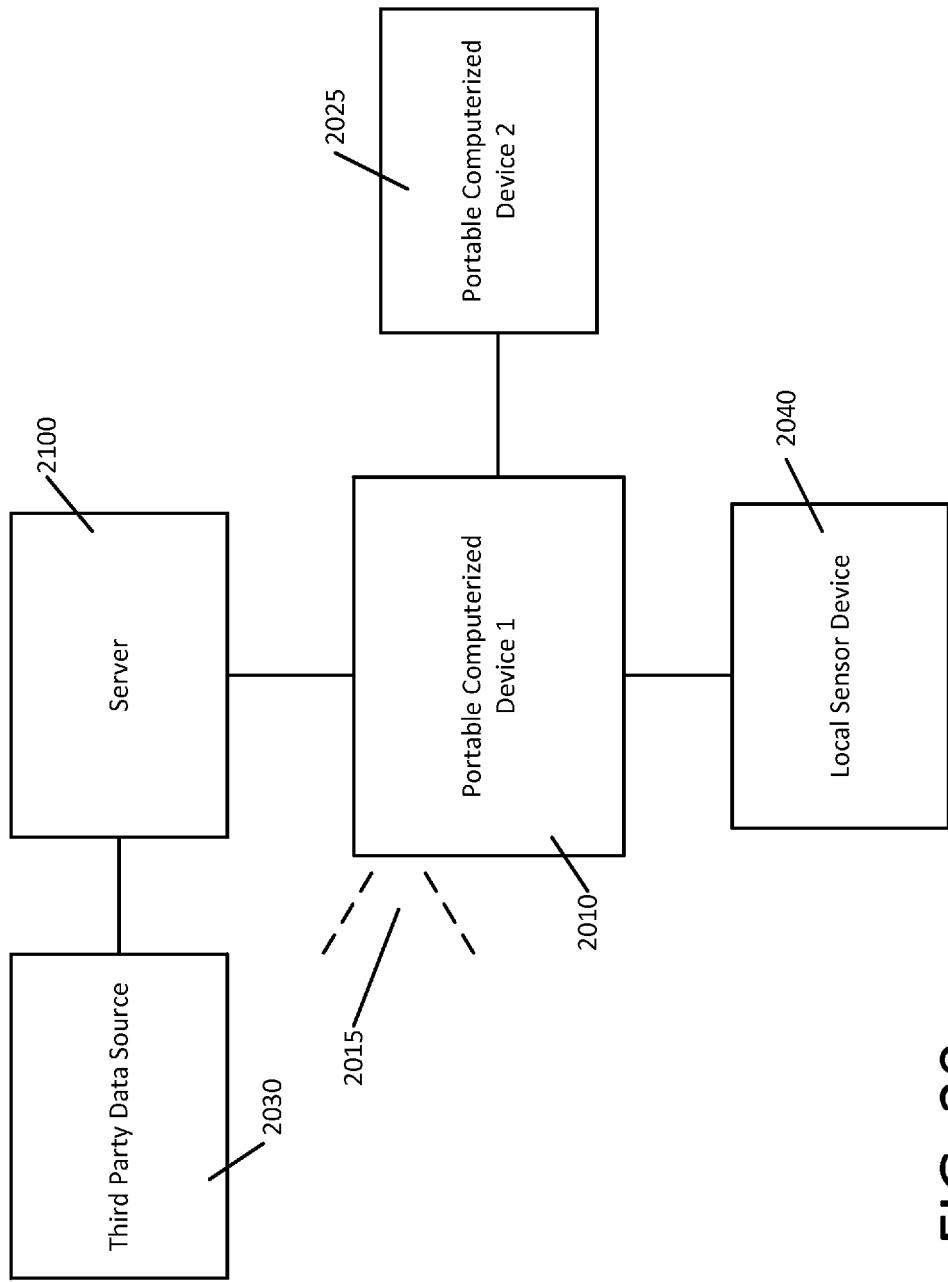
FIG. 20 illustrates the devices and information sources of FIG. 19 in communication, in accordance with the present disclosure.

FIG. 20 illustrates the devices and information sources of FIG. 19 in communication. Portable computerized device 2010 is illustrated gathering information from a camera device capturing images from field of view 2015. Portable computerized device 2010 further collects data from a secondary information source, wherein exemplary sources 2040, 2025, 2100, and 2030 are illustrated. A local sensor device embodied as local wind speed sensor 2040 is illustrated gathering data and communicating the data to device 2010. Further, portable computerized device 2025 is illustrated in communication with and providing information to device 2010. In one embodiment device 2025 can capture images of tokens within a view, thereby permitting device 2010 to further determine precise locations for tokens visible to either or both devices 2010 and 2025. Further, device 2010 is illustrated in communication with server 2100. Server 2100 can include computational modules and/or libraries of data that can be used to facilitate operation of programming upon device 2010. Further server 2100 can be in communication with a third party data source embodied as radar station 2030, providing information relevant to the operation of device 2010 through server 2100. The illustrated devices and information sources of FIG. 20 are illustrated as an exemplary network providing information to a portable computerized device. A number of networks and sources of information are envisioned related to the processes disclosed, and the disclosure is not intended to be limited to the particular example provided herein.

Tokens herein are disclosed as objects captured visually by a camera device. Other methods to acquire location and orientation information can be utilized to provide a token to an application on a portable computerized device. For example, three RF ID chips capable of providing proximity information to a corresponding sensor upon a portable computerized device known in the art could be used to located the device to a local area for display. A portable computerized device could be localized to a spot, for example, a starting location indicated on a floor as a starting location token (stand here and point your device at the spot on the wall), and accelerometers within the portable computerized device could be used to determine a changed location and orientation of the portable computerized device with respect to the starting location token. Other devices and processes for providing location data to the device are envisioned, for example, utilizing RF ID chips, a 3D map device, or inertial sensors within the device as spatial inputs to a model. Any of these alternative devices can be used in isolation or in cooperation with each other or with a camera device to provide or improve upon a spatial input to a three dimensional model.

The above description of illustrated examples of the present disclosure, including what is described in the Abstract, are not intended to be exhaustive or to be limited to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific example values, times, etc., are provided for explanation purposes and that other values may also be employed in other embodiments and examples in accordance with the teachings of the present disclosure.

The invention claimed is:

1. A portable computerized device configured to display a three dimensional graphic, the device comprising:
    a camera device capturing an image, the image comprising location data for each of a plurality of tokens, wherein each of the tokens is pre-programmed to be recognized by programming of the device; and
    wherein the portable computerized device is configured to operate a game-related simulation comprising:
        determining a relative position of a first token and a second token;
        applying programmed game rules based upon the determined relative position; and
        displaying a relative position dependent outcome based upon the determined relative position and the applied game programmed rules.

2. The device of claim 1, wherein the location data comprises a distance from one of the tokens to the camera device.

3. The device of claim 1, wherein the location data comprises an orientation of one of the tokens with respect to the camera device.

4. The device of claim 1, wherein the location data comprises:
    a distance from the first token of the plurality of tokens to the camera device;
    an orientation of the first token with respect to the camera device;
    a distance from the second token of the plurality of tokens to the camera device; and
    an orientation of the second token with respect to the camera device.

5. The device of claim 1, wherein the location data comprises a computed distance between the first token and the second token; and
    wherein the three dimensional graphic is based upon the computed distance.

6. The device of claim 1, wherein the location data comprises a height difference between the first token and the second token; and
    wherein the three dimensional graphic is based upon the height difference.

7. The device of claim 1, further comprising referencing data related to one of the tokens.

8. The device of claim 1, wherein the three dimensional graphic illustrates a plurality of virtual athletes upon a field.

9. The device of claim 1, wherein the three dimensional graphic illustrates a driver's education aid.

10. The device of claim 1, wherein the device is further configured to operate a model predicting construction requirements for a virtual structure.

11. The device of claim 10, wherein the virtual structure comprises a virtual bridge; and
    wherein one of the tokens is associated with a location of a support column for the virtual bridge.

12. The device of claim 10, wherein the virtual structure comprises a virtual wind turbine; and
    wherein the portable computerized device is further configured to predict wind patterns relative to the virtual wind turbine.

13. A portable computerized device configured to display a three dimensional graphic, the device comprising:
    a camera device capturing an image;
    a computerized processor:
        executing image recognition programming configured to identify location data for each of a plurality of tokens comprising a first token and a second token, wherein each of the tokens is pre-programmed to be recognized by the programming of the device;
        operating a three dimensional model utilizing the location data to operate a game-related simulation, comprising:
            determining a relative position of the first token and the second token; and
            applying programmed game rules based upon the determined relative position; and
        generating the three dimensional graphic based upon the three dimensional model.

* * * * *